United States Patent [19]
Smith

[11] Patent Number: 5,860,865
[45] Date of Patent: Jan. 19, 1999

[54] PNEUMATICALLY DRIVEN AUTO-BALANCE ROTOR HUB

[75] Inventor: Damon Carlton Smith, League City, Tex.

[73] Assignee: Lockheed Martin Corporation, Houston, Tex.

[21] Appl. No.: 635,076

[22] Filed: Apr. 19, 1996

[51] Int. Cl.$^6$ ................................................ F16C 3/00
[52] U.S. Cl. ................... 464/180; 74/573 R; 57/135; 242/597.5
[58] Field of Search .............. 464/24, 180; 242/612, 242/597.5; 57/135; 74/573 R, 572, 574

[56] References Cited

U.S. PATENT DOCUMENTS

| | | | |
|---|---|---|---|
| 2,518,226 | 8/1950 | Drake | 74/573 R |
| 2,659,243 | 11/1953 | Darrieus | 74/573 R |
| 2,778,243 | 1/1957 | Darrieus | 74/573 R |
| 3,203,273 | 8/1965 | Favrot | 74/573 R |
| 3,277,740 | 10/1966 | Favort | 74/573 R |
| 3,282,127 | 11/1966 | Deakin | 74/573 R |
| 3,410,154 | 11/1968 | Deakin | 74/573 R |
| 3,696,688 | 10/1972 | Goodrich et al. | 74/573 R |
| 3,733,923 | 5/1973 | Goodrich et al. | 464/180 X |
| 3,970,260 | 7/1976 | Bruggusser et al. | 74/573 X |
| 4,060,009 | 11/1977 | Wyman | 464/180 X |
| 4,075,909 | 2/1978 | Deakin | 464/180 X |
| 4,674,356 | 6/1987 | Kilgore | 74/573 R |

*Primary Examiner*—Eileen A. Dunn
*Attorney, Agent, or Firm*—W. H. Meise; S. A. Young

[57] ABSTRACT

A pneumatically operated autobalance arrangement includes a hub which connects a shaft with a driven rotational element. The hub is fitted with a plurality of circumferentially-acting bellows which move weights about the hub. The inflation state of each bellows is determined by an air gap, which varies in dimension depending upon the amount and location of an imbalance of the driven element. The pneumatic pressure can be generated by a turbine driven by the shaft. Force amplification is provided in another embodiment. Autobalance hubs can be stacked axially to provide two-plane dynamic balance.

16 Claims, 25 Drawing Sheets

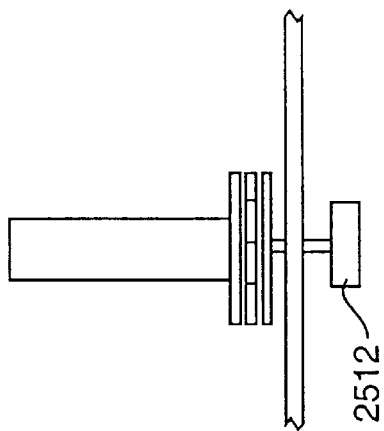
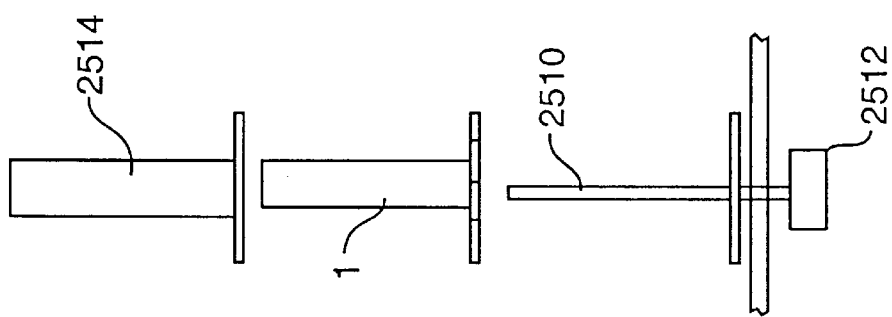
FIG. 25B
FIG. 25A

PNEUMATICALLY DRIVEN AUTO-BALANCE ROTOR HUB

FIELD OF THE INVENTION

This invention relates to automatic balancing arrangements for spinning shafts and devices, and more particularly such automatic balancing systems which are pneumatically controlled.

BACKGROUND OF THE INVENTION

The use of high speed rotating machinery is of such fundamental importance in modern industry that the operating speed and efficiency of many processes are defined by the capabilities of rotating equipment. In many cases maximum operating speed is limited by the onset of serious vibrations caused by imbalance of the rotor or rotating portion of the machine, and bearing wear can be a serious maintenance issue. If the machine is operating at a rotational speed well below the first flexural critical speed of the rotor shaft, the shaft can be considered to be stiff, in which case the imbalance can be described as a displacement and/or misalignment of the principal axis of inertia of the rotating mass relative to the axis of rotation. This imbalance is the result of unequal mass distribution about the axis of rotation. Balancing in the case of a rigid shaft can be accomplished by the so called "two-plane" or dynamic balancing procedure. At higher rotation speeds, shaft deformation becomes a factor, and the shaft must be considered as being flexible. The balancing procedure in the flexible-shaft situation is termed flexible-rotor balancing or "modal balancing". Balancing of either rigid and flexible rotors is accomplished by the placement of compensating balance masses along or about the rotor. The size and placement of these balance masses is usually determined by testing the rotor using a balancing machine, as described in chapter 39 of Shock & Vibration Handbook, Third Edition, 1988, edited by Cyril M. Harris, published by McGraw-Hill Book Company, New York. For the purpose of understanding the invention, the conventional process of testing and balancing the rotor of a machine when the machine is out of service and its rotor is placed on a balancing machine, as described in the above-mentioned Handbook, is referred to as "manual" balancing, as contrasted with "automatic" balancing, which is a continuous adjustment process which takes place while the rotor is in service, implemented by some type of negative feedback control system. Manual balancing is effective in dealing with rigid rotor vibrations, i.e. those vibrations which do not involve significant shaft flexion. This is because the rigid rotor vibration is the direct result of an initial asymmetry of mass distribution, and the asymmetry can be detected and corrected using a balancing machine. However, manual balancing is relatively ineffective in dealing with flexible rotor vibrations, because when the rotor operates at speeds which cause significant shaft flexure, a destabilizing positive feedback process becomes dominant in determining rotor dynamics. A very small initial imbalance becomes magnified in the flexible-rotor case because the shaft deforms in response to the net centrifugal force, and the deformation causes additional imbalance. This positive feedback process cannot be influenced by manual balancing, because manual balancing affects only the initial mass distribution and cannot respond to shaft flexure. On the other hand, automatic balancing, which is a control process, provides negative feedback which can compensate for the destabilizing effects of the positive feedback attributable to shaft flexure. With automatic balancing, the rotor can be operated at significantly higher speeds, and with less bearing wear, than without automatic balancing. However, prior art automatic balance systems are costly and complex. A prior art automatic balancing system might require electronic sensors to detect the imbalance, analog and/or digital electronic circuitry to process the imbalance input signals, and actuators to reposition the balance masses as required to implement the control effect. Improved automatic balancing systems are desired.

SUMMARY OF THE INVENTION

In general, the invention lies in a self-contained automatic balancing device or system for use with machines in which a mass (such as a flywheel or bobbin) is attached to, and rotates with a rotating shaft or rotor. The automatic balancing device may be mounted principally on the rotating mass, or it may be situated in mechanical series between the shaft and the rotated mass so that it comprises a hub. The device may be operated pneumatically by air pressure which is generated by a turbine which is a component of the hub. A pneumatic circuit provides the control signal and the actuation, so that no electronic sensors or actuators are required.

More particularly, according to one aspect of the invention, an automatic balance arrangement includes a rotor which rotates about an axis of rotation. A rotated mass is flexibly affixed to the rotor, and defines a center of mass which may not lie on the axis of rotation of the rotor. As a result, the rotated mass defines a "light" side and a "heavy" side, and, when rotatably driven by the rotor, has a tendency to rotate about an axis of rotation which does not necessarily coincide with the axis of rotation of the rotor, as a result of which the rotated mass may vibrate. A plurality of fluid apertures are mounted on either the rotor or the rotated mass, and are circumferentially spaced thereabout, with each of the fluid apertures spaced from a portion of the rotated mass or the rotor, respectively, by an associated fluid discharge gap $\gamma$. The dimension of gap $\gamma$ is nominally equal to that of the other fluid discharge gaps $\gamma$, but the dimensions of the associated fluid discharge gaps $\gamma$ varies circumferentially when the axis of rotation of the rotated mass does not coincide with the axis of rotation of the rotor. A plurality of weights are circumferentially spaced about and mounted on the rotated mass. The weights are arranged for circumferential motion relative to the rotated mass. The nominal mounting locations of the weights about the rotated mass is selected so that the center of mass of the weights in conjunction with the rotated mass is nominally at the center of rotation of the rotated mass. Each of a plurality of weight position controllers is coupled to one of the weights, and is arranged for circumferential motion in a first direction in response to a contraction in the dimension of the associated one of the fluid gaps, and for circumferential motion in a second direction in response to expansion of the dimension of the associated one of the fluid gaps. The first and second directions are selected to move the associated one of the weights circumferentially away from the heavy side of the rotated mass and toward the light side of the rotated mass, whereby the rotated mass tends to be balanced and the vibration reduced.

In a particular embodiment of the invention, the plurality of fluid apertures are mounted on the rotor, with each of the fluid apertures spaced from the portion of the rotated mass by an associated fluid discharge gap $\gamma$. The dimensions of the fluid discharge gaps are nominally equal to those of the other fluid discharge gaps, but vary circumferentially when the axis of rotation of the rotated mass does not coincide with the axis of rotation of the rotor. The variation in dimension is such that those of the fluid apertures which are adjacent the heavy side of the rotated mass are associated with relatively smaller ones of the fluid discharge gaps, and those of the fluid apertures which are adjacent the light side of the rotated mass are associated with relatively larger ones of the fluid discharge gaps. In this particular embodiment of the invention, the weight position controllers are arranged for expansion in response to a contraction in the dimension of the associated one of the fluid gaps, and for contraction in response to expansion of the dimension of the associated one of the fluid gaps. Each of the weight position controllers is located on the same side of the rotated mass as its associated fluid gap, relative to the axis of rotation of the rotor. This results in the effect that those weight position controllers on that side of the rotated mass which, during rotation, have the smaller or smallest fluid discharge gaps, tend to move their associated weights circumferentially away from the side of the rotated mass having the smaller fluid discharge gaps, which is the heavy side of the rotated mass, toward the light side of the rotated mass, and those weight position controllers on that side of the rotated mass which, during rotation, have the larger or largest fluid discharge gap, tend to move their associated weights circumferentially toward the side of the rotated mass having the larger fluid discharge gap, which is the light side of the rotor. The weight position controllers may be located between mutually adjacent weights. The weight position controllers may include bellows.

In another embodiment of the automatic balance arrangement, the fluid apertures are mounted on the rotated mass, with each of the fluid apertures spaced from a particular longitudinal portion of the rotor by an associated fluid discharge gap, the dimension of which is nominally equal to that of the other fluid discharge gaps. The dimensions of the associated fluid discharge gaps varies circumferentially when the axis of rotation of the rotated mass does not coincide with the axis of rotation of the rotor, with the variation in dimension being such that those of the fluid apertures which are adjacent the heavy side of the rotated mass are associated with relatively larger ones of the fluid discharge gaps, and those of the fluid apertures which are adjacent the light side of the rotated mass are associated with relatively smaller ones of the fluid discharge gaps. The weight position controllers are arranged for expansion in response to an contraction in the dimension of the associated one of the fluid gaps, and for contraction in response to an expansion of the dimension of the associated one of the fluid gaps. These weight position controllers are located diametrically opposed, relative to the axis of rotation of the rotor, to their associated fluid gaps, with the effect that those weight position controllers on that side of the rotated mass which, during rotation, has the smallest fluid discharge gap, tend to move their associated weights circumferentially away from the side of the rotated mass having the largest fluid discharge gap, which is the heavy side of the rotated mass, toward the light side of the rotated mass, and those weight position controllers on that side of the rotated mass which, during rotation, has the largest fluid discharge gap, which is the heavy side of the rotated mass, tend to move their associated weights circumferentially toward the side of the rotated mass having the smallest fluid discharge gap, which is the light side of the rotated mass.

In one embodiment, each of the bellows is inflated with compressed fluid from a source of compressed fluid, which is preferably a common source, and simultaneously exhausted through an associated one of the fluid apertures and into that one of the fluid discharge gaps which is adjacent to the associated one of the fluid apertures. Each of the bellows tends to inflate in an amount which is inversely related to the dimension of that one of the fluid discharge gaps which is adjacent to the associated one of the fluid apertures, with the effect that those bellows on that side of the rotor which, during rotation, has the larger fluid discharge gap (the "light" side) tend to inflate less than those bellows on that side of the rotor (the "heavy" side) which has the smaller fluid discharge gap. In turn, those of the bellows which tend to inflate more tend to push their adjacent weights circumferentially from the heavy side of the rotor toward the light side of the rotor in a manner which tends to move the axis of rotation of the rotor toward the axis of rotation of the drive hub, and thereby reduce vibration. In a preferred embodiment of the invention, the fluid is air, and the air for pressurizing the bellows originates from a pump associated with the rotating members.

BRIEF DESCRIPTION OF THE DRAWING

FIG. 2b illustrates the result of the movement illustrated in FIG. 2a;

FIG. 13b is a plot of the bellows pressure versus inlet port dimension for the structure of FIG. 13a;

FIG. 17a is a section view through the longitudinal centerline of the hub; FIGS. 17b, 19, and 21 are cross-sections of FIG. 17a, FIG. 18 is an isometric view of the arrangement of FIG. 17a, and FIG. 20 illustrates details of the airflow in the arrangement of FIG. 17a;

FIG. 22 is a cross-section taken through the longitudinal centerline of the hub of another embodiment of the invention, FIGS. 25A and 25B show the hub arrangement exploded and assembled, respectively, as a part of a concentrically stacked assembly.

DESCRIPTION OF THE INVENTION

Figure 1A:
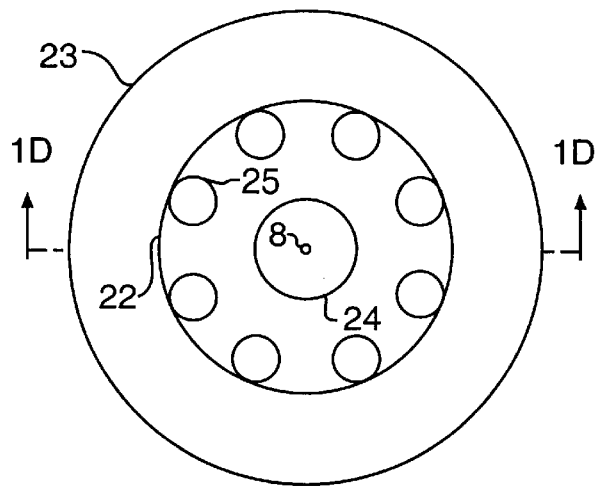
FIG. 1A is a simplified view of a rotor or shaft with a rotated mass and balance weights.
Figure 1B:
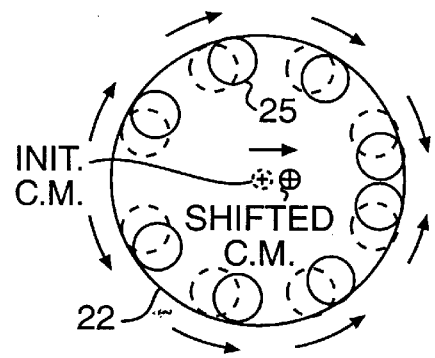
FIG. 1b illustrates the motion of the center of mass as a result of the movement of the weights illustrated in FIGS. 1A and 1D.
Figure 1C:
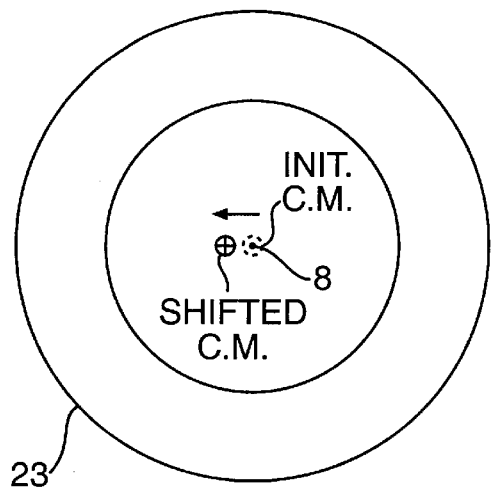
FIG. 1c illustrates a change in the center of mass of a disk resulting from the movement of FIG. 1b.
Figure 1D:
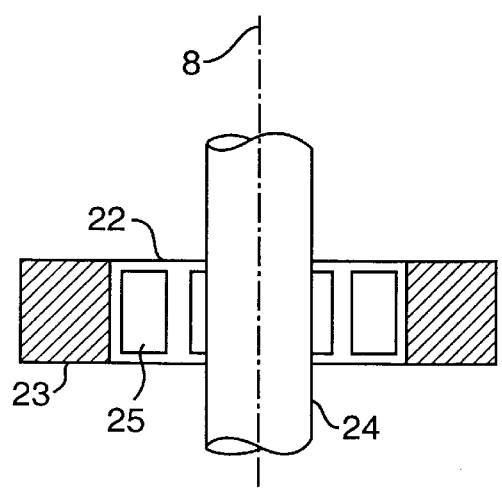
FIG. 1D is a cross-section of the arrangement of FIG. 1A.
Figure 2A:
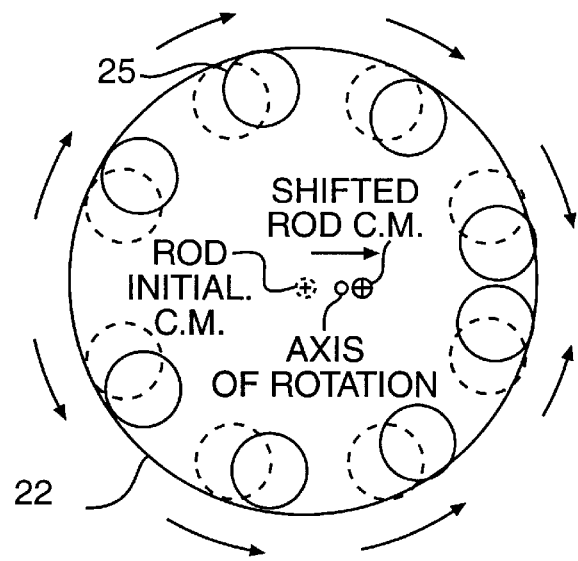
FIG. 2a is a simplified representation of the arrangement of FIG. 1B under a particular operating condition.
Figure 2B:
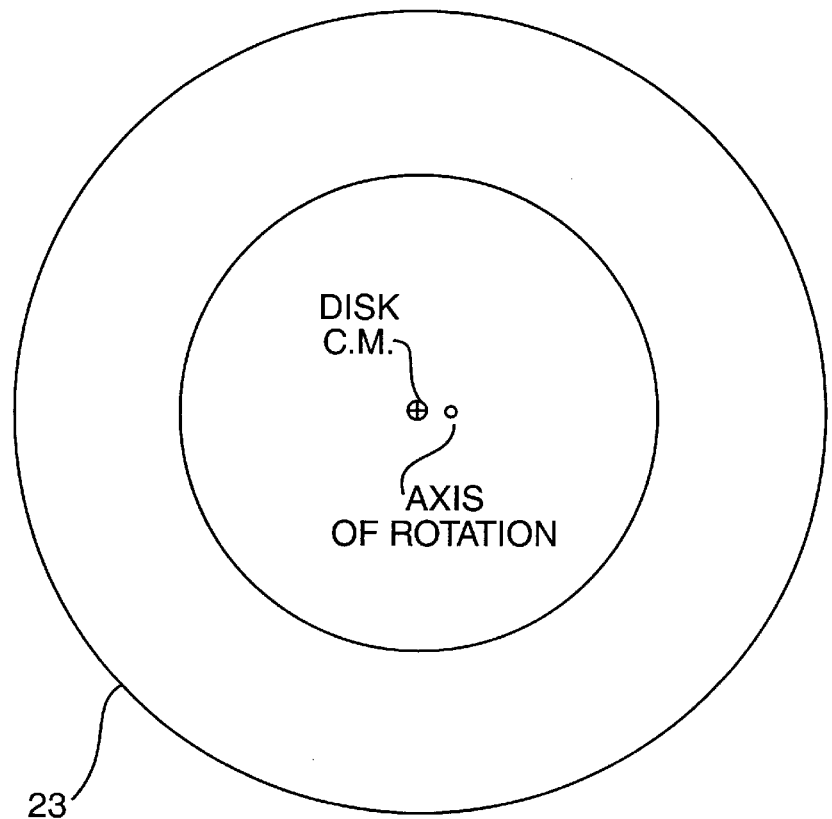

The balancing of a rotating member by means of shifting balance weights may be understood at a basic level by considering FIGS. 1A–1C, where the hyphen represents the word "through," and FIGS. 2a and 2b. In FIG. 1A and 1D, a shaft 24 rotates about an axis 8, driving a hub 22, and the attached rotating mass 23. As shown in FIG. 1D, hub 22 occupies the annular space between the attached rotated mass 23 (the disk or flywheel) and the rotating shaft 24. Ideally, the shaft, hub, and mass are perfectly balanced, and their geometric centers and centers of mass (CM) lie on axis of rotation 8. An array of solid cylindrical rods or weights, some of which are designated 25, occupies a circular raceway inside the hub 22. These rods 25 are the compensating balance masses of an automatic balancing system. While FIG. 1A illustrates eight rods 25 as an example, the actual number can may be greater or less, depending on the specific hub design.

The auto-balancing rotor hub according to the invention works to restore balance by the shifting of balance masses 25 contained within the hub 22. Generally, the balancing masses should be solid and made of a dense material such as steel. In FIG. 1A the rods 25 are shown to be uniformly distributed circumferentially along or about the raceway, so that the Center of Mass (CM) of the system of rods is located at the geometric center of the hub 22. The CM for the rod system in this initial condition is also indicated as "INIT. CM" FIG. 1B is a schematic illustration of the original mass distribution (dash-line circles) of weights 25 within the race of hub 22, and the solid lines represents the repositioning of the masses 25 in response to an imbalance. FIG. 1C shows disk 23 separately. For purposes of illustration, shifts of the CM of the disk and weights in the Figures are greatly exaggerated.

Assume that disk 23 of FIG. 1c initially has a uniform mass distribution so that its CM is located at its geometric center. The hub 22 and disk 23 are mounted concentrically on shaft 24 and the entire assembly is balanced, so the initial center of mass coincides with a system axis. Further assume that the disk has become unbalanced so that its CM has shifted away from its geometric center, as indicated by the open arrow in FIG. 1C. In response to this disk imbalance, the autobalance action according to the invention shifts (by means not shown in FIGS. 1A, 1D, 1B, and 1C) the system of rods 25 circumferentially about or along the raceway of hub 22 as indicated by the small solid arrows in FIG. 1B. This redistribution of the positions of the rods 25 causes the CM for the rod system to shift to the right, as suggested or indicated by the large open arrow in FIG. 1B. The CM of the combined assembly will return toward the axis of rotation 8, even though the disk 23 itself remains unbalanced.

The "mass-displacement product" is a term which may be used to describe the imbalance of the disk 23 of FIGS. 1A, 1D, 1B, and 1C. The mass-displacement product is simply the product of the mass of the disk 23 multiplied by the distance of offset of the disk CM away from the axis of rotation 8. The mass-displacement product is a vector quantity, because it involves both magnitude and direction. Similarly, the mass-displacement product for the system of balance masses can be used to describe the stabilization provided by the hub balancing arrangement as the product of the total mass of the system of balance masses (i.e. the combined weight of all the rods in FIG. 1A) multiplied by the distance of offset of the CM of the system of rods as measured from the rotation axis. If the mass-displacement products for the disk and system of rods are equal in magnitude and opposite in direction, the CM of the overall assembly will be returned to the axis of rotation. Although the disk 23 is ordinarily much more massive than the system of rods, the CM offset of the system of rods is much greater than that of the disk or flywheel 23. The stabilization capacity of the auto-balancing hub according to the invention is simply the maximum possible mass-displacement product of the system of balance masses 25. If this stabilization capacity is larger than the worst-case mass-displacement product of the disk, such a hub can, in principle, restore perfect balance to the overall assembly. Of course, perfect balance is never achieved in actual practice.

In the example discussed above and illustrated in FIGS. 1A, 1D, 1B, and 1C, the source of the imbalance is a shift of the CM of the disk 23 away from its geometric center and thus away from the axis 8 of rotation. Imbalance can also occur if shaft 24 flexes or is otherwise deformed so that its geometric center shifts away from the rotation axis, even if the CM of the disk remains at its geometric center. FIGS. 2a and 2b illustrate the result of an imbalance which occurs due to movement of the rotation axis 8, notwithstanding that the CM of the disk 23 remains at its geometric center. In response to this type of imbalance, the auto-balance system according to the invention redistributes the locations of rods 25 within the hub 22 raceway so that the overall CM of the combined assembly returns toward the axis 8 of rotation.

When an imbalance arises due to a shift of the CM of the disk away from its geometric center as described in conjunction with FIGS. 1A, 1D, 1B, 1C, 2a, and 2b, the net centrifugal force causes flexure or flexion of the shaft 24, leading to an additional imbalance. This is the positive feedback process mentioned above. The total imbalance, therefore, involves both of the mechanisms described in conjunction with FIGS. 1A, 1D, 1B, 1C, 2a, and 2b. When the contribution to the imbalance caused by shaft flexure is insignificant, the shaft is considered to be rigid.

Figure 3A:
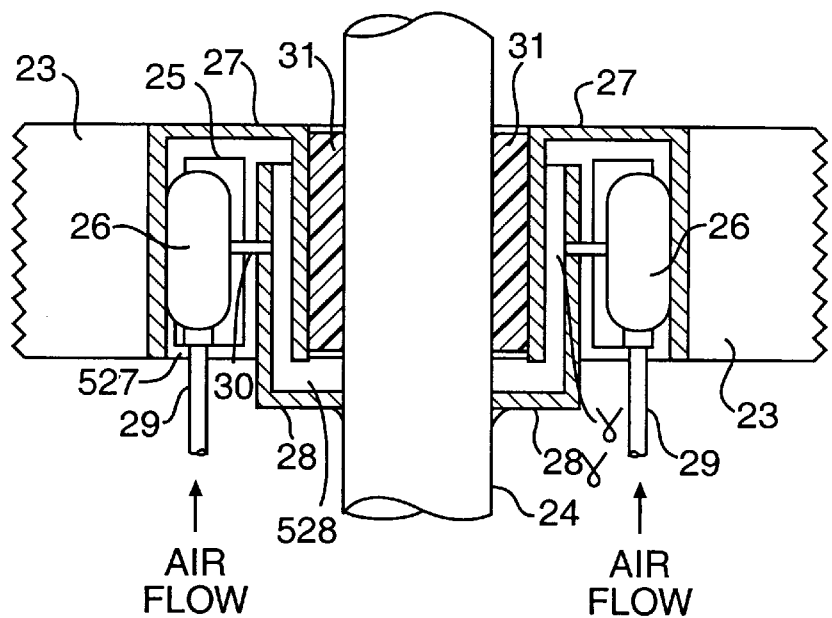
FIG. 3A is a longitudinal cross-section of a hub according to an aspect of the invention.
Figure 3B:
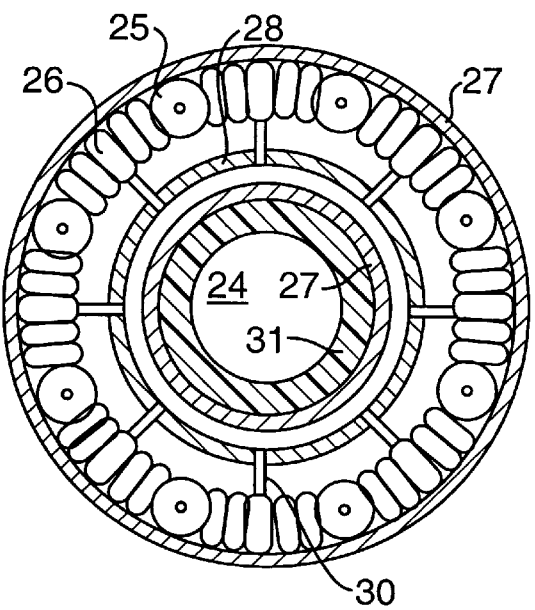
FIG. 3B is a radial cross-section thereof.

FIGS. 3A, 3B, 3C, 3D, and 3E illustrate details of a pneumatic or air-operated arrangement for automatically shifting the balance weights in accordance with an aspect of the invention. FIG. 3A is a longitudinal cross section of the hub, taken in a plane lying in the rotation axis 8. FIG. 3B is a radial cross-section of the hub of FIG. 3A, in a plane perpendicular to the axis 8 of rotation. In FIGS. 3A, and 3B, hub 22 includes two overlapping shell pieces designated 27 and 28. Shell 28 is welded or otherwise rigidly connected to shaft 24, while shell 27 is connected to shaft 24 by means of a flexible collar 31. Two annular spaces 527 and 528 are defined by the overlapped shell pieces 27 and 28. The system of balance rods 25 occupies the outer annular space 527, which is also termed the hub raceway. A system of pneumatic actuators 26 is interposed between the weight rods 25 in the raceway. Each actuator 26 includes a bellows or balloon which is capable of being inflated by air flow, and of deflating under proper conditions. For the purposes of the application, the actuator 26 bellows may be considered to be a flexible air bladder, which preferably has reinforcing ribs or other means to limit the expansion of the bladder in two dimensions, for confining the expansion and contraction essentially to a single dimension, which is the actuation dimension. The actuation dimension for the bellows of each actuator 26 is oriented circumferentially within the raceway of hub 22.

Figure 3C:
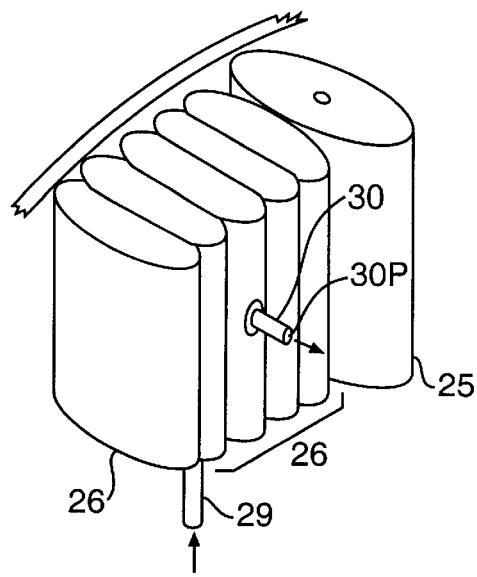
FIG. 3C is a perspective or isometric view of a portion of the hub of FIGS. 3A and 3B, illustrating details of a bellows-operated pneumatic balance weight shifting arrangement.
Figure 3D:
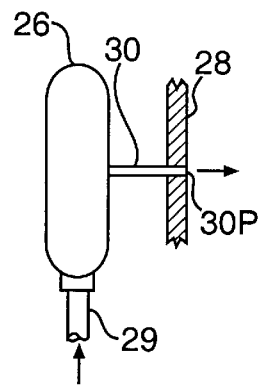
FIGS. 3D and 3E are cross-sections illustrating details of the pneumatic bellows arrangements.
Figure 3E:
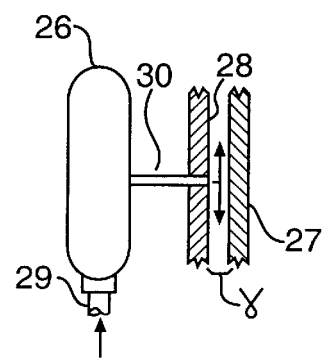

The adjacent balance rods 25 of each pair of balance rods within the raceway of hub 22 are separated by a single bellows unit actuator 26, as illustrated in FIG. 3B. FIG. 3C is a perspective or isometric view of a single balance rod and an associated single one of the bellows actuators or units 26. As illustrated in FIG. 3A and 3C, each bellows is connected by air tube 29 to a source of pressurized air. Air is vented from each bellows unit or actuator 26 by a discharge tube 30, which includes a port 30P attached to shell 28, as illustrated in FIG. 3D. Air vented from each bellows passes through its associated tube 30 and port 30P, and discharges into the inner annular space 528 defined by the overlap of shell pieces 27 and 28. The inner annular space 528 is termed the air receiving chamber. Air entering the air receiving chamber 528 from all of the ports 30P is vented to the outside of the hub system. The separation distance between shell pieces 27 and 28 at the location of the discharge port 30P is termed the "discharge gap", and is given the symbol γ, as shown in FIG. 3E. Discharge gap γ determines the air-pressure versus airflow relationship for air flowing out of a discharge port 30P and into the air receiving chamber 528. As with the case of the relative positions of the centers of mass of the various elements and axes of rotation, the normal discharge gap dimension (the discharge gap when no net centrifugal force is applied to the hub) is greatly enlarged in the Figures for purposes of illustration. The actual normal discharge gap dimension may be as small as 0.01 inches, or even smaller.

Figure 4A:
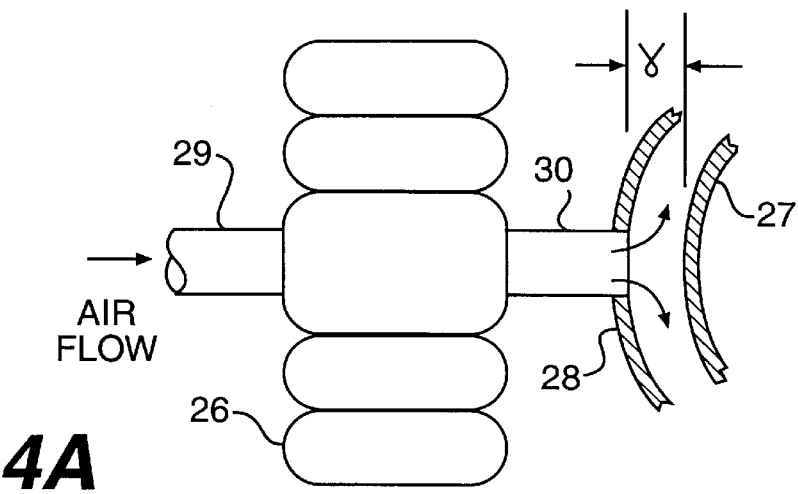
FIG. 4a is a simplified illustration of a bellows receiving air under pressure at its air input port, and venting through a tube into a discharge gap $\gamma$, when the dimension $\gamma$ is nominal.
Figure 4B:
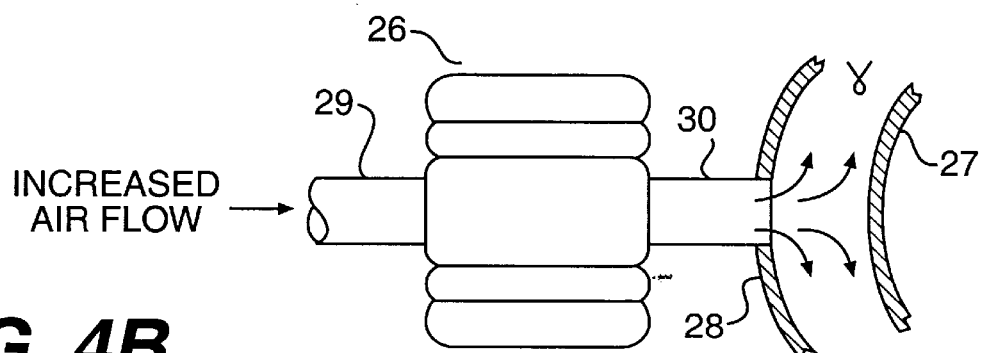
FIGS. 4b and 4c are similar, but for relatively large and small discharge gaps, respectively.
Figure 4C:
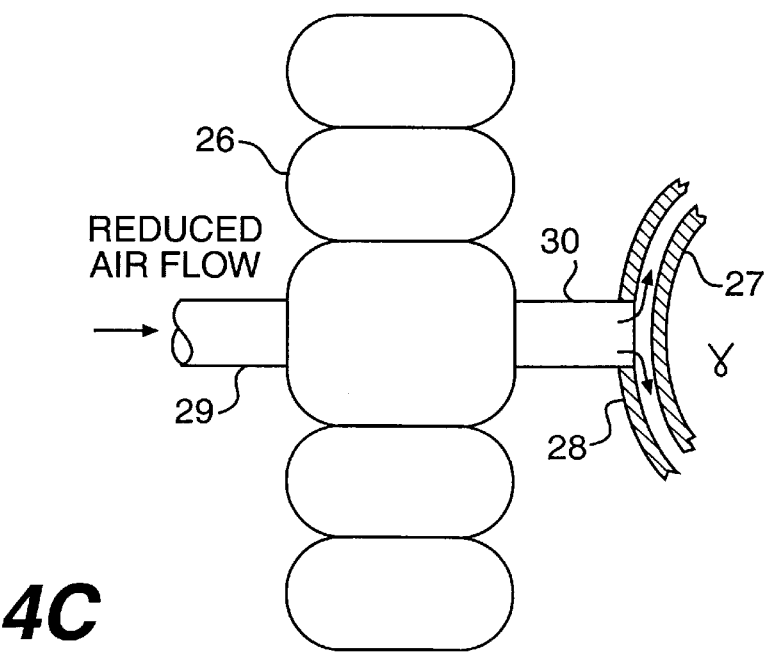

FIGS. 4a, 4b, and 4c together illustrate the basic action of one of the bellows of FIGS. 3A, 3B, 3C, 3D, and 3E in response to changes in the associated discharge gap, when the supply air pressure is held constant. FIG. 4a illustrates a bellows actuator 26 receiving air flow under pressure at its air input port 29, and venting through tube 30 into discharge gap γ, when the dimension 7 is nominal (half-way between large and small). As illustrated, bellows actuator 26 has a particular vertical dimension, or dimension in the direction of actuation. FIG. 4b illustrates the same bellows actuator 26 receiving air under the same pressure at its air input port 29, and venting through tube 30 into discharge gap γ, when the discharge gap dimension γ is larger than nominal. As illustrated in FIG. 4b, bellows actuator 26 has a smaller vertical dimension than that illustrated in FIG. 4a. FIG. 4c illustrates the same bellows actuator 26 as that of FIGS. 4a and 4b, receiving air under the same pressure, and venting through tube 30 into discharge gap γ, when the discharge gap dimension γ is smaller than nominal. As illustrated in FIG. 4c, bellows actuator 26 has a larger vertical dimension than the nominal dimension illustrated in FIG. 4a. Basically, one may understand from FIGS. 4a, 4b, and 4c that the bellows becomes more inflated as the dimension of discharge gap γ is reduced.

Figure 6A:
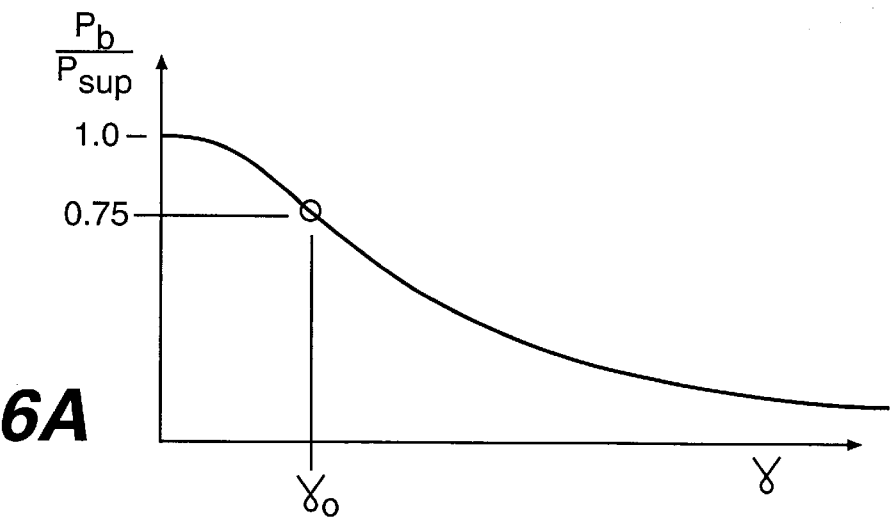
FIG. 6a is a plot of bellows pressure versus discharge gap dimension for a structure which is illustrated in FIG. 6b.
Figure 6B:
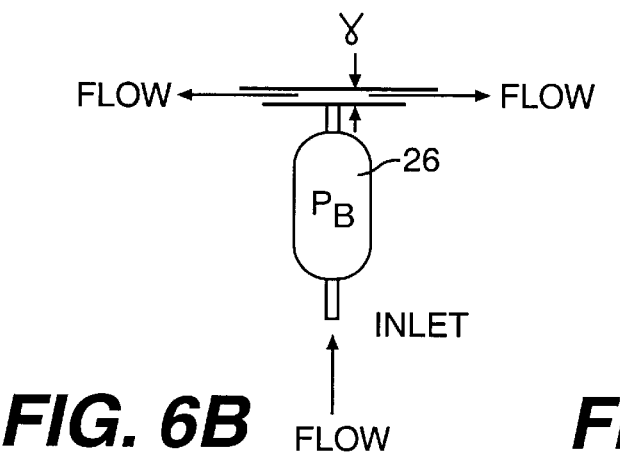

FIG. 6a is a plot of the relationship between bellows "gauge" air pressure $P_B$, normalized to the supply pressure $P_{SUP}$, and the dimension of the associated discharge gap γ of FIG. 6b, when supply air pressure $P_{SUP}$ is held as a constant at the inlet of bellows 26 FIG. 6b and for a given length, diameter, and air friction coefficient for the supply air tubing between the pressure source and the bellows. The term "gauge" indicates that the pressure measurement is actually the difference between the absolute air pressure and ambient atmospheric pressure. When the bellows "gauge" air pressure is zero, the air within the bellows is at atmospheric pressure. When "air pressure" is mentioned herein without further distinction, gauge air pressure is meant, not absolute pressure. A truly accurate representation of the relationship between bellows air pressure and discharge gap should take into account numerous secondary effects such as entropy increase due to irreversible processes, heat transfer, and the like. However, FIG. 6a is simplified in that such secondary effects are not included. FIG. 6a illustrates the certain aspects which are important to understanding the theory of the invention. When the discharge gap dimension γ is zero, the bellows air pressure equals the source pressure $P_{SUP}$. The sensitivity of the bellows air pressure to a change in gap dimension is greatest (maximum negative slope) at the gap dimension $\gamma_o$ which produces a bellows air pressure which is 75% of the supply pressure, as indicated in FIG. 6a. For a small operational range around this optimum gap dimension $\gamma_o$, the pressure versus gap dimension can be approximated by a straight line having a negative slope. This approximate relationship is helpful in analysis of the pneumatic control system as an approximately linear system.

Figure 5A:
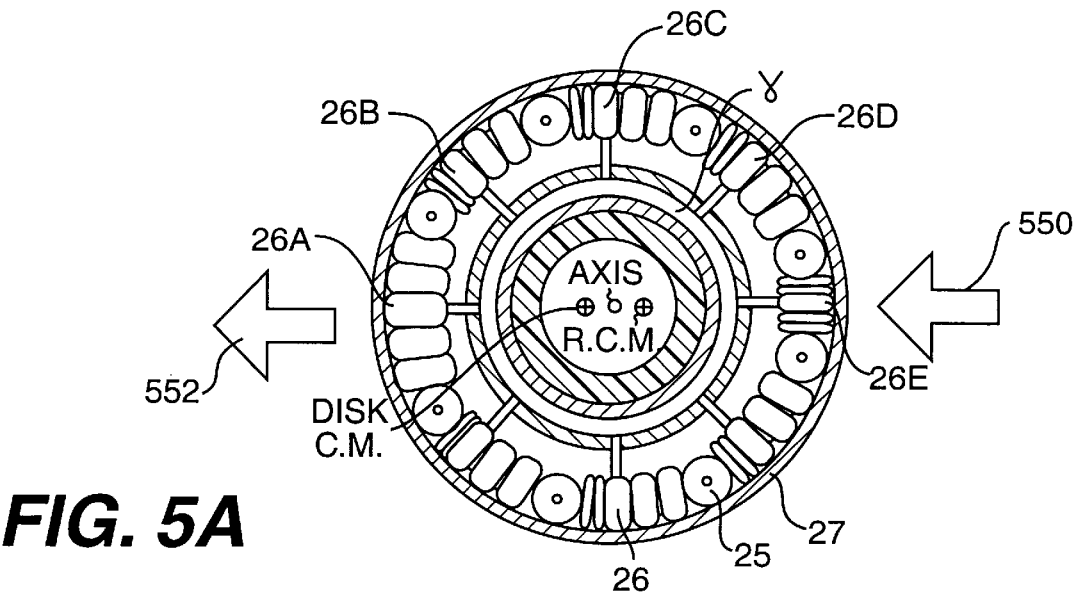
FIGS. 5a and 5b are longitudinal and radial cross-sections of an auto-balancing hub similar to FIGS. 3a and 3b, but in the presence of an imbalance which affects the discharge gap $\gamma$.
Figure 5B:
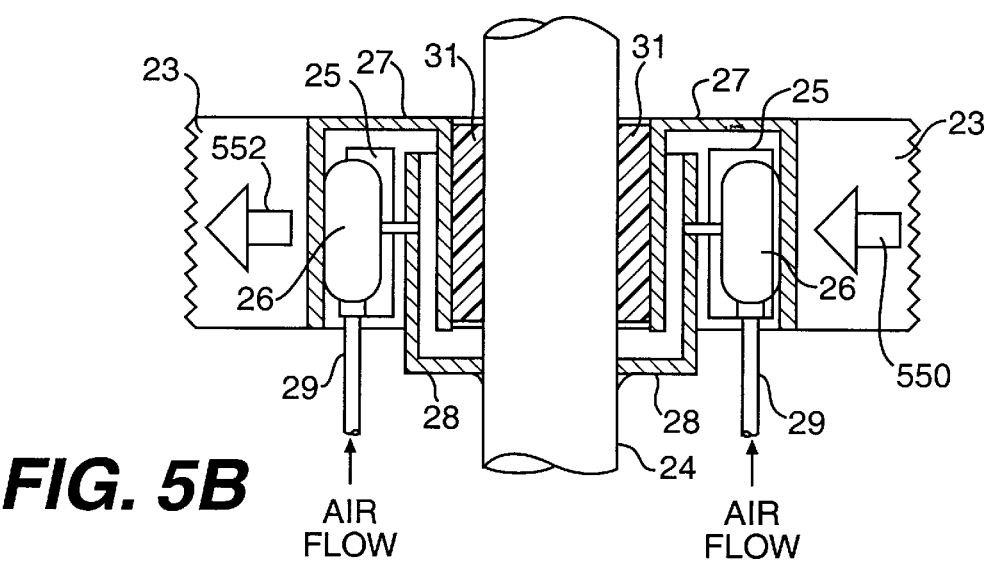
Figure 5C:
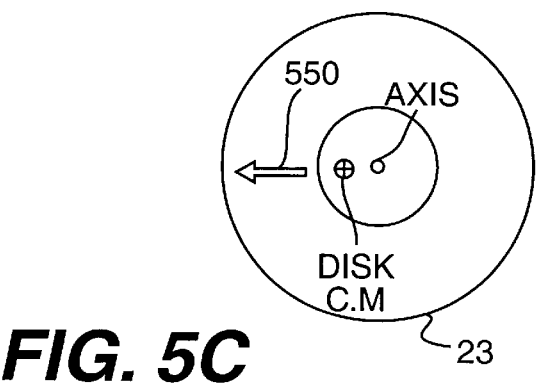
FIG. 5c illustrates the forces acting on the structure due to imbalance.

FIGS. 5a, 5b, and 5c show how the system of bellows can be used to redistribute the balance masses (rods) as an auto-balance response. FIGS. 5a and 5b are similar to FIGS. 3a and 3b, respectively, but illustrate the effect on gap γ of imbalance in the rotating system, and the resulting movement of the balance rods and their CM, designated RCM. The rotating disk 23 of FIG. 5a is imbalanced with its CM offset to the left away from the rotation axis. As mentioned above, the magnitude of the offsets are exaggerated for purposes of illustration. The offset of the disk CM away from the rotation axis causes a net centrifugal force to act on the disk 23 and its integral hub 27 when the disk rotates. In FIG. 5a, forces imparted by the imbalanced disk are shown as large open arrows 550, 552 pushing on the right side of the hub 27 and pulling on the left side. In actuality, the amount of preload contact force between the disk and hub may cause this "pulling" action to be manifested simply as a reduction of radial contact force at this location. Shell 27 applies the net centrifugal force to the flexible collar 31, as illustrated in FIGS. 5a and 5b. Flexible collar 31 allows a slight lateral shift of shell 27, and produces an eccentricity between shell pieces 27 and 28. This eccentricity is visible in FIGS. 5a and 5b, with the dimension of gap between the edge of hub 27 and the shell 28 being relatively small at the left, and relatively large on the right. It should be understood that, once the disk and hub are rotating at full speed, the gap dimension tends to remain at a constant small size on the "heavy" side and large on the "light" side.

Comparing FIGS. 3a, 3b with FIGS. 5a, 5b, it can be seen that the mutual eccentricity of shells 27 and 28 in FIGS. 5a and 5b produced by the imbalance produces a distortion in the circumferential uniformity of the gap γ, and therefore also produces a distorted pattern of inflation of the various bellows 26 of the system of bellows. Five of the bellows illustrated in FIG. 5a are designated as 26A through 26E. The eccentricity of shell pieces 27 and 28, as a result of the pressure difference caused by the different dimension of discharge gap γ, causes bellows A to become more inflated and bellows E to become less inflated, as compared to the bellows of FIG. 3a. Bellows A and E are on opposite sides of the hub, and are the ones which are most directly aligned with the net centrifugal force vector. These changes in the amount of inflation are caused by the changes in the discharge gap dimensions for the two bellows (smaller gap for bellows A, larger gap for bellows E).

Figure 7A:
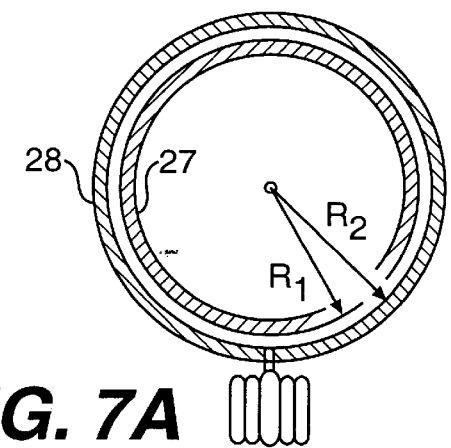
FIG. 7a is a simplified representation of the discharge gap between shells of the autobalance drive hub.
Figure 7B:
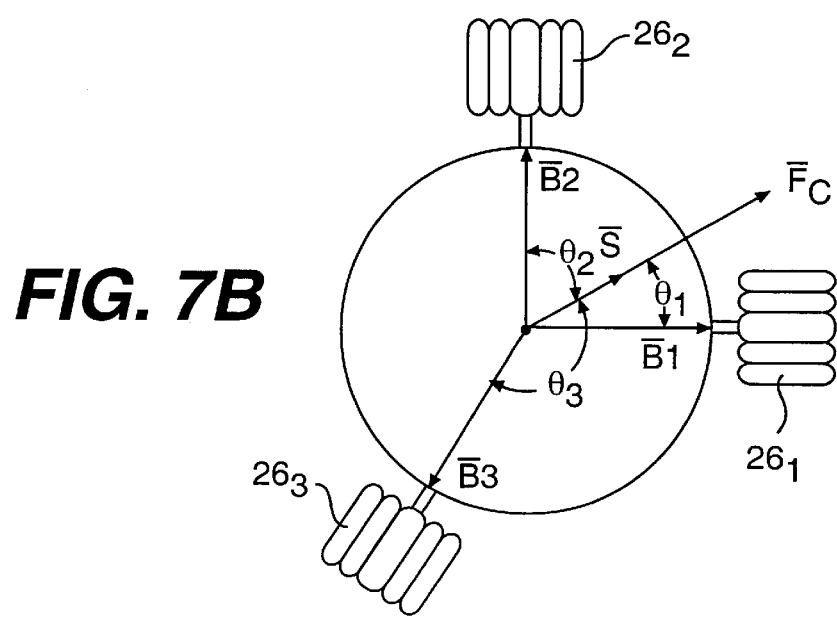
FIG. 7b illustrates various vectors associated with the arrangement of FIG. 7a and their relationships.

A more analytic description of the relationship between the shifting of shell 27 and the discharge gaps of the various bellows units may be understood, with reference to FIGS. 7A and 7B. When shells 27 and 28 of FIG. 3a are concentric, all of the bellows 26 have the "normal" or "nominal" discharge gap γ which is defined by their radii. FIG. 7A shows shells 27 and 28 in their concentric arrangement, along with two labeled radii, R1 and R2. The radius from the geometric center of shell piece 27 to the outer surface of its inner wall is labeled R1. The radius from the geometric center of shell piece 28 to the inner surface of its outer wall is labeled R2. The nominal or normal gap is $\gamma_N$=R2−R1 when the two shell pieces 27 and 28 are concentric. Usually the normal discharge gap is a small percentage of R1 (less than 5 percent), whereupon the discharge gap can be closely approximated for each bellows unit by a simple trigonometric consideration, as illustrated in FIG. 7B. A unit vector is defined for each bellows unit, which represents the direction of the bellows discharge port away from the geometric center of shell 27. The designation as a unit vector means that its magnitude (length) is one. Three unit direction vectors are shown in FIG. 7B, and labeled as B1 for bellows number 26, B2 for bellows number $26_2$, and B3 for bellows number $26_3$. Vector $F_c$ in FIG. 7B represents both the magnitude and direction of the net centrifugal force. Vector S represents the magnitude and direction of the shift of shell 27 caused by vector Fc. The magnitude of vector S is simply the magnitude of the net centrifugal force divided by the stiffness of the flexible collar 31. The direction of vector S is the same as vector $F_c$. The change in gap dimension γ for any bellows caused by an eccentricity of shell pieces 27 and 28 is the vector component of S which lies along the unit direction vector for that bellows, multiplied by negative 1. The change in gap dimension γ can be calculated as the magnitude of S multiplied by minus one, and then multiplied by the cosine of the angle between S and the unit direction vector. These GAP Dimensions are indicated as $\gamma_1 \approx \gamma_N - |\overline{S}|\cos\theta_1$ for bellows 1, $\gamma_2 \approx \gamma_N - |\overline{S}|\cos\theta_2$ for bellows 2, and $\gamma_3 \approx \gamma_N - |\overline{S}|\cos\theta_3$ for bellows 3, where the symbol has its ordinary meaning of "approximately equal to". The equations for the gap dimensions of the three bellows of FIG. 7B is set forth in the Figure. The cosine of the angle between S and the unit direction vector is a multiplication factor which is often termed the "direction cosine".

Figure 8B:
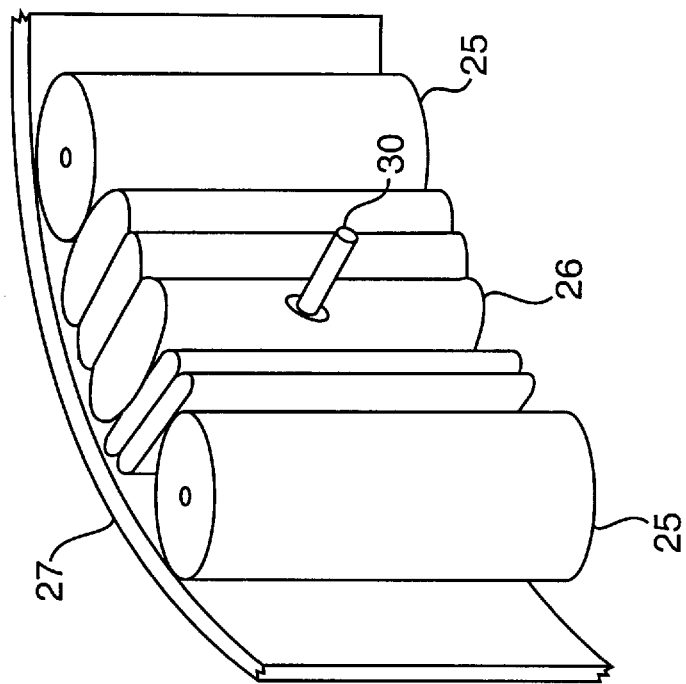
FIGS. 8a and 8b are isometric or perspective views of bellows units together with their adjacent weights, showing different expansion conditions.
Figure 8A:
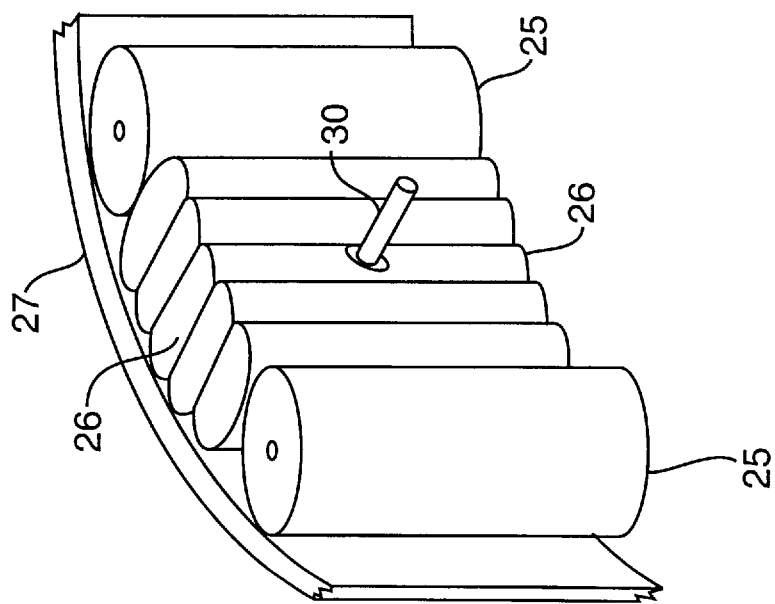

Referring once again to the several bellows units 26 shown in FIG. 5a, it may be seen that bellows A and E are the ones most affected by the eccentricity of shells 27 and 28, because the cosines of the angles between the unit direction vectors and the net force vector are largest in magnitude for these two bellows. More particularly, bellows A is fully inflated, while bellows E is completely deflated. The bellows identified by letter B is slightly more inflated than in FIG. 3B, because its gap dimension has been slightly reduced. However, the main distortion of bellows B of FIG. 5a is due to the difference in inflation of its two adjacent bellows A and C. The weight rods 25 which are interposed between the bellows are free to move circumferentially, and they transmit circumferential forces between adjacent bellows units. Bellows A of FIG. 5a has more air pressure than bellows C, as a consequence of the particular imbalance. This produces a net circumferential force acting on bellows B. Because the discharge port (tube 30 in FIGS. 3 and 4) of the bellows is fixed by attachment to shell 28, the center of the bellows cannot shift circumferentially, and thus the bellows as a unit cannot shift circumferentially in response to the net circumferential force. Instead, the bellows becomes distorted, with unequal "inflation" of its two sides. Thus, in FIG. 5a, one side of bellows B (the side facing the highly pressurized bellows A) is illustrated as collapsed, while its other side is shown to be expanded. The terms "expanded" and "collapsed" may be more appropriate than "inflated" and "deflated" for this situation, where the pressure within the two halves of the bellows, and the "inflation" (pressure) in the two halves is the same. FIG. 8a illustrates bellows A of FIG. 5a, and FIG. 8b illustrates bellows B of FIG. 5. FIGS. 8a and 8b are helpful in understanding the asymmetric inflation of bellows B under the described conditions. Referring again to FIG. 5a, bellows C and D also have net circumferential forces because of the differences in inflation of the adjacent bellows. Therefore, bellows C and D are illustrated as being asymmetrically inflated in a manner similar to that of bellows B.

The balance rods 25 which are interposed between the bellows 26 of FIG. 5a are shifted circumferentially within the raceway compared to their positions in FIG. 3b. The position of the CM of the overall system of rods, denoted R.C.M. in FIG. 5a, has shifted to the right of the axis. Thus, the bellows have repositioned the rod or weight system so that the overall CM of the combined assembly is returned toward the rotation axis. Therefore, the pneumatic circuitry and balance masses constitute a negative feedback control system for control of the balance of the rotating system.

The sensitivity of this control system is affected by the angle of application of the net centrifugal force vector. If the force vector happens to be aligned with a pair of discharge ports in the arrangement described in conjunction with FIGS. 5a and 7B, there will be two bellows units which respond fully to the force vector, because their direction cosines have a magnitude of 1. In general, however, such an alignment does not occur. The result is that the "gain" of the controller is dependent on the angle of application of the net centrifugal force vector. This can be described as a "gain ripple," which depends upon exactly where the imbalance acts. The relative magnitude of this gain ripple, compared to the average gain value, depends on the specific design of the hub, and the ripple tends to be reduced as more bellows units are used in the circumferential array. However, increasing the number of bellows units has the undesirable effect of reducing the amount of rod shifting which can be accommodated between adjacent bellows. A reasonable trade-off between these two opposing considerations is to provide the hub with eight bellows distributed around the hub raceway. The use of eight bellows assures that the gain ripple is a small percentage of the average gain and that for all angles of application of the net centrifugal force vector, the gain is large enough to respond effectively to the imbalance. Of course, different numbers of bellows units may be desired when different assumptions andor conditions require.

Figure 9:
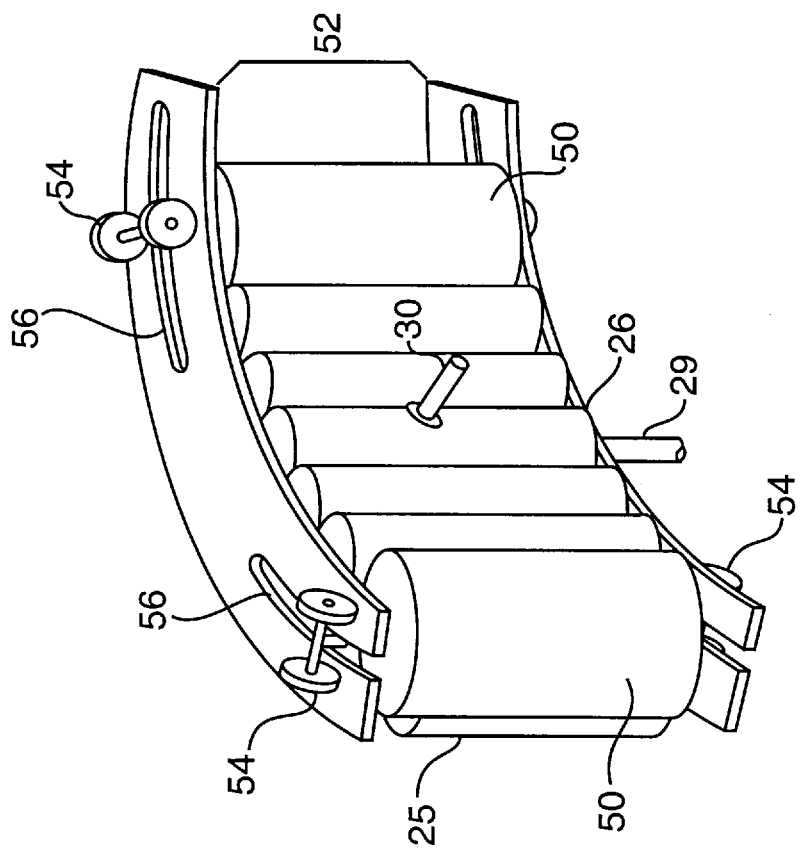
FIG. 9 is a simplified isometric or perspective view of a portion of a drive hub including a bellows and two cylindrical weights, showing a support arrangement.

In order to hold the cylindrical weights or balance masses 25 of FIG. 5b in the hub, while still allowing circumferential movement in response to small circumferentially directed forces, weights are constrained to run along a raceway. If the bellows have a low friction coating such as TEFLON, the rods can slide against the bellows as they roll on the raceway. Alternatively, each such rolling rod or roller weight 25 can roll within its own roller shell 50, as illustrated in FIG. 9. The roller shell 50 may incorporate bearings or a low-friction coating, so that the rollers 25 move freely within the shell 50. The roller shell itself does not roll along the raceway. As also illustrated in FIG. 9, the rolling balance masses 25 are constrained to stay within their operational positional envelope between adjacent bellows units 26 by a two sets of roller wheels 54 associated with each roller shell 50. Each set of roller wheels 54 rides on roller guide brackets 52. The maximum circumferential stroke is limited by roller stroke limiting slots 56 in the roller guide brackets 52. Pressurized air is provided to bellows unit 26 of FIG. 9 by way of a tube 29.

Figure 10:
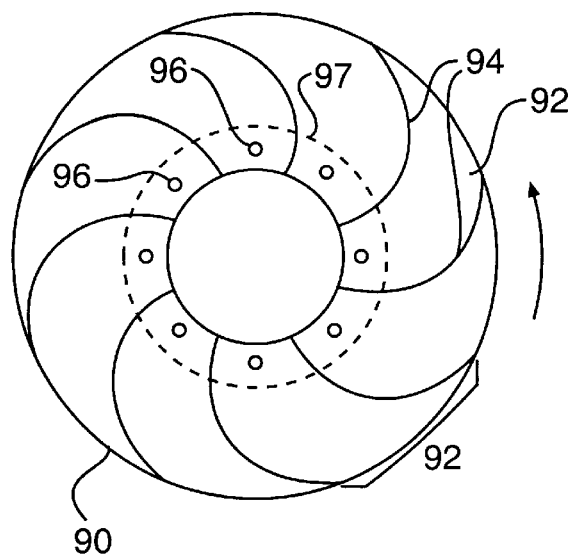
FIG. 10 is a simplified representation of an impeller which may be mounted for rotation with the hub, for compressing air for operating the pneumatic system of FIGS. 3a, 3b, 5a, and 5b.

Pressurized air may be provided to the input ports of the various bellows by any desired method. In one embodiment of the invention, the pressurized air is provided by a turbine which is an integral part of the hub. In FIG. 10, air is pressurized and is provided to each bellows unit by a separate air supply tube which is labeled as 29 in FIG. 9. In FIG. 10, a turbine or impeller 90 concentric with shaft 24, and driven thereby, includes a plurality of segments 92 defined by adjacent turbine blades 94. Each segment tends to compress air toward the center of the turbine when the turbine rotates in the direction indicated by the arrow. An air supply aperture or tube 96 conveys pressurized air from a location within each segment which is near the center of the turbine. In the arrangement of FIG. 10, each turbine segment 92 has a single air supply aperture 96. Each turbine segment may have a replaceable air filter to prevent airborne particles from entering the bellows, or they may have a common filter screen 97. In some applications, a non-rotating housing which includes air filter screens may be placed around the hub turbine. Such a housing should not touch the rotating system. From the turbine, each air supply aperture 96 connects to an air supply tube 29 of a bellows.

Figure 11:
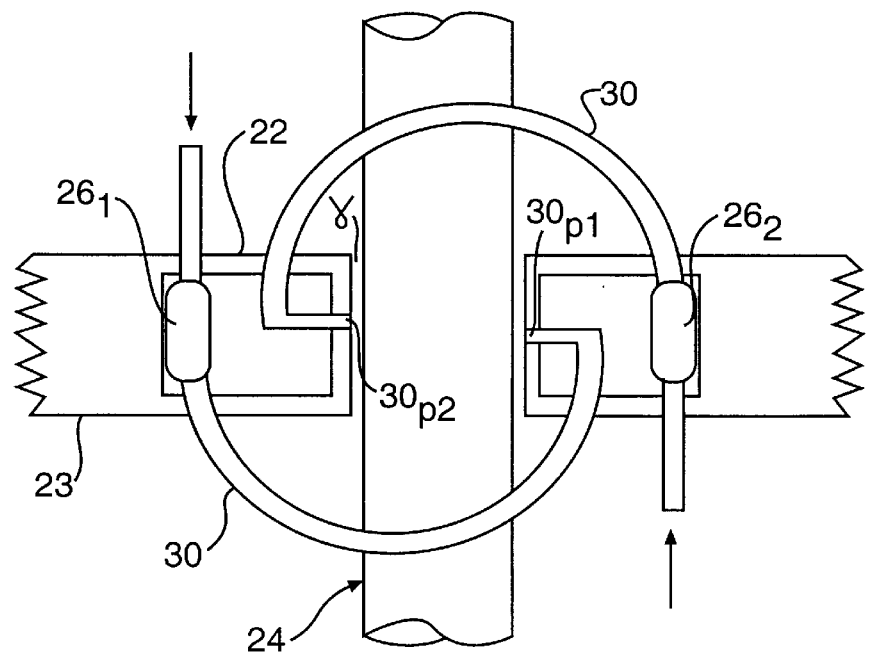
FIG. 11 is a simplified representation of a hub which has its bellows orifices cross-coupled to opposite sides of the hub, to eliminate the need for nested shells.

FIG. 11 is a simplified representation of another embodiment of the invention. In the arrangement of FIG. 11, shaft 24 rotates a disk 23 by means of a hub 22 and an elastic drive collar (not illustrated). In the arrangement of FIG. 11, there is no need for two concentric shells, because the air discharge tube 30 of each bellows 26 is connected to a discharge port 30P which is located diametrically across the hub from the bellows. More particularly, as illustrated in FIG. 11, the discharge port 30P1 is located 180 angular degrees away from its bellows 261, (in other words, on the opposite side of the hub). Similarly, the discharge port 30P2 is located on the opposite side of the hub from its bellows 262. The gap γ is formed between the inner wall of the hub and the shaft. FIG. 11 does not show the details of how the hub is connected to the shaft, or the air receiving chamber.

Figure 12B:
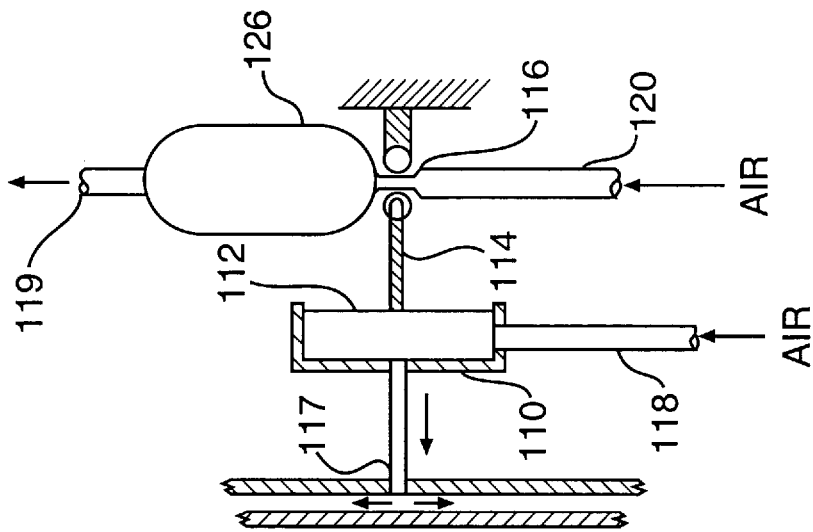
FIGS. 12A and 12B are simplified block and schematic diagrams which illustrate two different embodiments of the invention, each of which incorporates a pneumatic pressure amplifier.
Figure 12A:
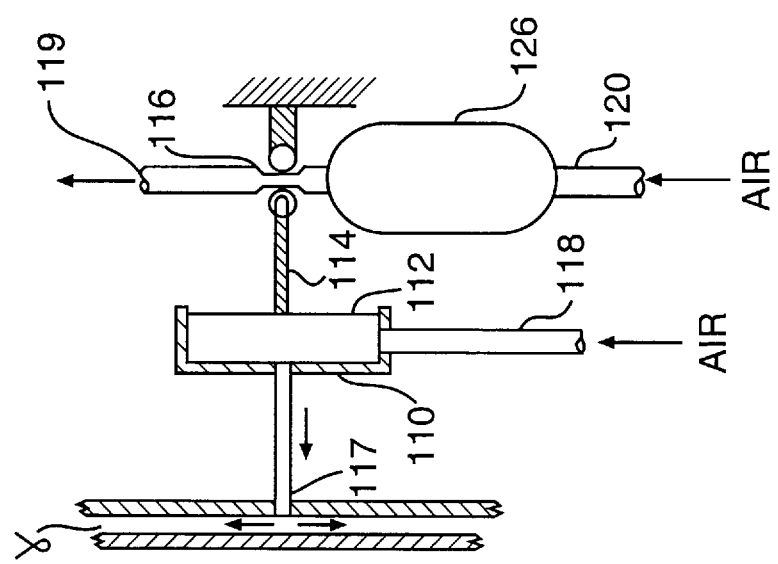

In some cases it may be advantageous to provide amplification of the feedback loop gain of the pneumatic circuit. FIGS. 12A and 12B illustrate two embodiments which incorporate a pneumatic pressure amplifier to increase the sensitivity of the bellows response to a change in discharge gap. The two embodiments are identical except for the location or placement selected for an air flow constriction mechanism, relative to the bellows. In FIGS. 12A and 12B, an amplification chamber 110 has a flexible diaphragm 112. An actuator rod 114 is connected between the diaphragm 112 and the air flow constriction mechanism 116. Because the diaphragm 112 is flexible, the force on the actuator rod 114 is essentially the product of the air pressure within the amplifier chamber 110, multiplied by the surface area of the diaphragm. In both arrangements shown in FIGS. 12A and 12B, it is important to note that separate air supply tubes 118 and 120 are used for the amplification chamber 110 and the bellows unit 126. This eliminates the dependency of amplifier chamber supply air pressure on the bellows air pressure.

In FIG. 12A, the constriction mechanism 116 regulates the amount of air which is vented from the bellows 126. In this arrangement, a decrease in the discharge gap dimension causes an increase of bellows air pressure. The sensitivity of bellows inflation response to a change in discharge gap dimension is greatly increased by the amplifier, because the large surface area of the diaphragm produces a large change of force for a given change of air pressure within the amplification chamber, and this amplified force directly controls the amount of constriction of the bellows vent port. In FIG. 12B, the constriction mechanism regulates the amount of air supplying the bellows. Therefore, in this embodiment, a decrease in the discharge gap causes a reduction of bellows air pressure.

Figure 13A:
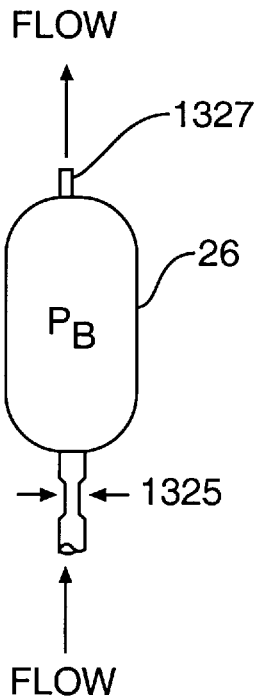
FIG. 13a is a simplified illustration of a bellows with a constricted inlet port.
Figure 13B:
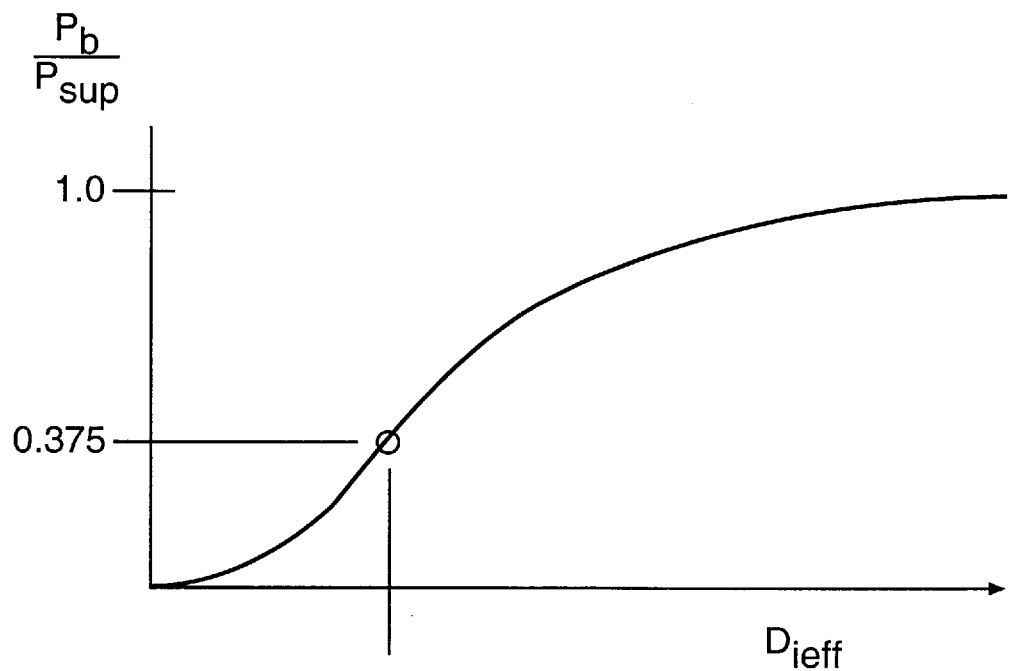

FIG. 13a is a simplified illustration of a bellows 26 with an air inlet port 1325 which is set to a particular diameter, as by constricting, and which is exhausted by a vent 1327. FIG. 13b illustrates the relationship between bellows gauge air pressure $P_B$, normalized to the supply pressure $P_{SUP}$, and the effective diameter $D_{ieff}$ of the inlet port 1325 of the arrangement of FIG. 13a. Just as in the case of FIG. 7A, the intent here is simply to show the basic shape of the curve. FIG. 13b illustrates that, when the effective diameter of the inlet port is zero, the bellows gauge pressure is zero (the air in the bellows is at atmospheric pressure). The sensitivity of the bellows air pressure to the effective diameter of the inlet port 1325 is maximized (maximum positive slope) at the effective diameter at which the bellows air pressure is 37.5% of the supply pressure, as indicated in FIG. 13b. FIG. 13b shows that, for a small operational range of effective inlet port diameter about this optimum sensitivity value of effective diameter, the pressure-versus-diameter relationship can be approximated by a straight line having a positive slope. This is helpful in analysis of the pneumatic control system as an approximately linear system.

Figure 17A:
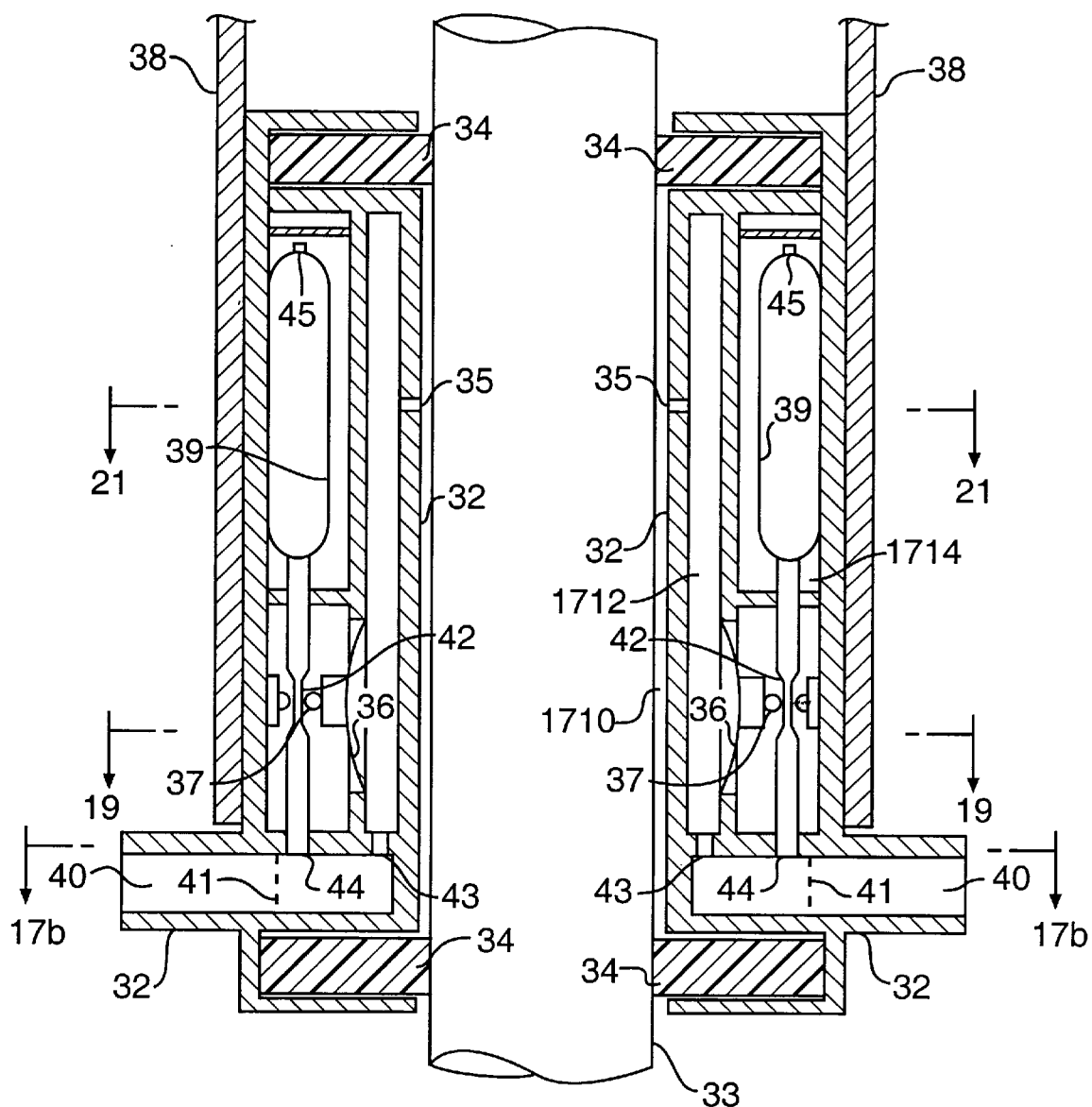
FIGS. 17a, 17b, 18, 19, 20, 21, and 22 together illustrate a first embodiment of the invention which uses a pneumatic amplifier.

The arrangement of FIG. 12B is extremely sensitive to the diameter of the discharge gap γ because of the force amplification provided by the amplification chamber 110 and its flexible diaphragm 112. Also, the bellows inflation response to a change in discharge gap dimension is opposite to that of the response of the arrangement of FIG. 12A or that explained in conjunction with FIGS. 4a, 4b, or 4c. This reversed response allows for a simplification in the hub design which avoids the use of the overlapping shell pieces 27 and 28 of FIG. 3. A specific example using the simplified hub design is shown in FIG. 17a and is discussed below.

The mathematics of the positive feedback process of flexible rotor imbalance, and its alteration by negative feedback autobalance control according to the invention, are discussed in relation to FIGS. 14a, 14b, 14c, 14d, 14e, and 14f.

Figure 14A:
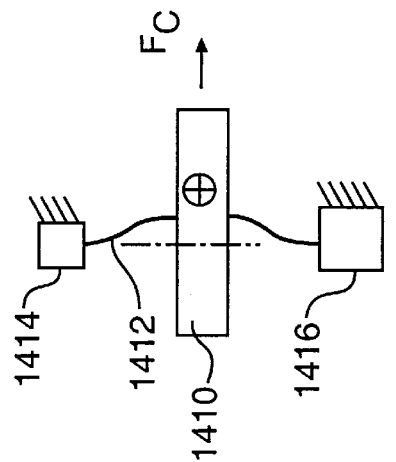
FIGS. 14a and 14b represent a flywheel and its support in a balanced condition.
Figure 14C:
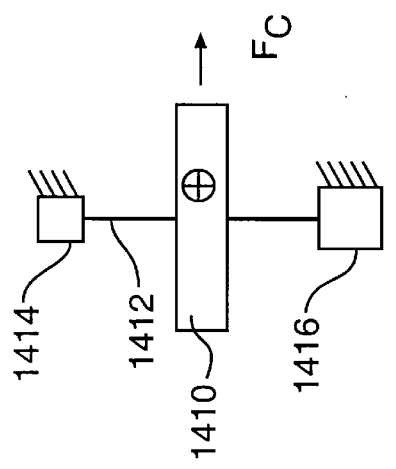
FIGS. 14c and 14d represent an unbalanced, but not critical condition.
Figure 14E:
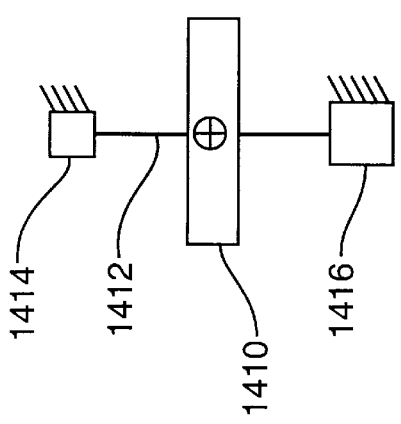
FIGS. 14e and 14f represent the same flywheel and support, rotating at a speed near critical.
Figure 14B:
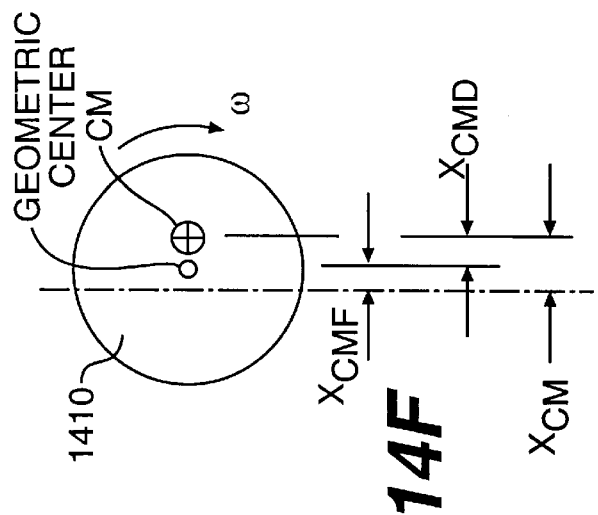
Figure 14D:
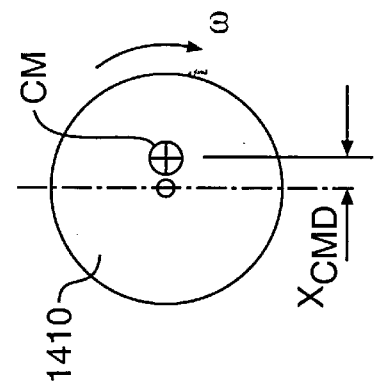
Figure 14F:
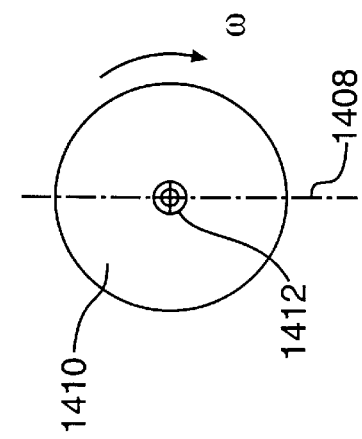
Figure 15A:
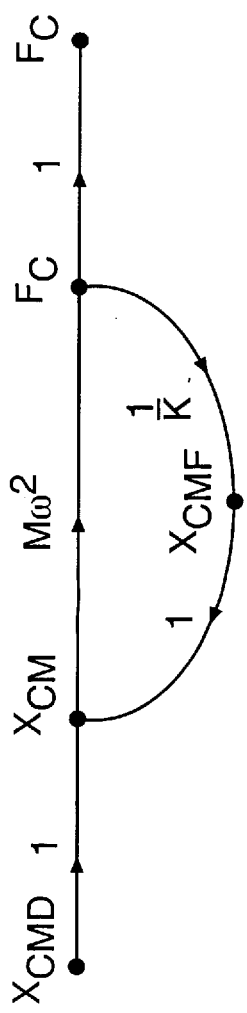
FIG. 15a is a flow chart illustrating the operation of a prior-art flywheel.
Figure 15B:
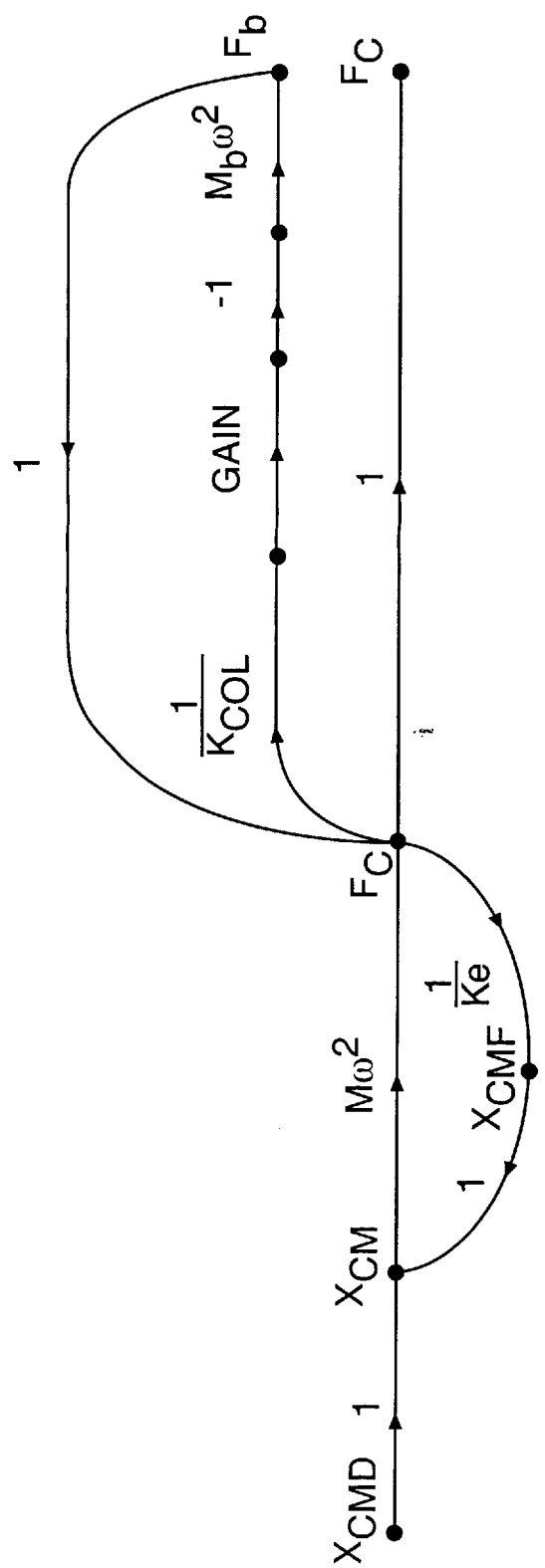
FIG. 15b is a flow chart for a flywheel including a control system in accordance with the invention.

FIGS. 14a, 14b, 14c, 14d, 14e, and 14f together illustrate the basic mechanism of the first flexural mode of rotor imbalance, and define variables which are used in the signal flow graphs and equations of FIGS. 15a and 15b. FIGS. 14a and 14b represent a flywheel 1410 mounted on a rotating shaft 1412 supported by a bearing 1414 and driven by a motor 1416 for rotating the shaft about an axis of rotation 1408 at a speed of $\omega = (2\pi \text{ RPM})/60$, where RPM represents revolutions per minute. The shaft is driven at one end by a motor and supported at the other end by a bearing. The assembly is shown to be balanced in FIG. 14b, with the CM of the flywheel located on the axis of rotation. In FIG. 14d, the CM of the flywheel is offset from the axis of rotation by an amount labeled as $X_{CMD}$. The term $X_{CMD}$ stands for "flywheel CM offset due to asymmetry of mass distribution". The corresponding centrifugal force $F_c$ associated with $X_{CMD}$ is shown in FIG. 14c. It is important to note that FIGS. 14c and 14d represent the condition of STATIC EQUILIBRIUM in a ROTATING REFERENCE FRAME fixed to the flywheel. In FIG. 14e, the centrifugal force attributable to force $F_c$ has caused flexure of the shaft. The shaft flexure is shown greatly exaggerated for purposes of illustration. The additional offset due to flexure of the shaft is labeled as $X_{CMF}$ in FIG. 14f. The term $X_{CMF}$ stands for "flywheel CM offset due to shaft flexure". The total offset of the flywheel $X_{CM}$, away from the axis of rotation, labeled as $X_{CM}$, is illustrated in FIG. 14f as being the summation of $X_{CMD}$ and $X_{CMF}$. The net centrifugal force is equal to the mass-displacement product of the flywheel multiplied by the square of the rotation frequency. As defined earlier, the mass-displacement product is simply the $X_{CM}$ multiplied by the mass of the flywheel. Note that, in FIGS. 14e and 14f, the net centrifugal force is increased as a result of the shaft flexure. This increase in force leads to additional shaft flexure, which in turn increases the centrifugal force. This interaction constitutes the positive feedback process discussed above. If the shaft rotation speed $\omega$ is less than the critical speed of the flexural mode of the shaft, the increase in restoring force due to stiffness of the shaft is greater than the increase in centrifugal force caused by $X_{CMF}$. A condition of static equilibrium will be reached in the rotating reference frame under this condition, as illustrated in FIGS. 14c and 14d. Note that, even though a condition of static equilibrium exists in the rotating reference frame, the net centrifugal force produces sinusoidal forces in the nonrotating reference frame, and these sinusoidal forces result in movement which constitute the vibration due to shaft imbalance. At the critical speed, the increase in centrifugal force caused by $X_{CMF}$ equals the increase in restoring force caused by shaft stiffness, and no position of equilibrium exists. As can easily be imagined, such a condition may result in destruction of the rotating equipment.

FIGS. 15a and 15b illustrate signal flow diagrams for the basic flywheel system shown in FIGS. 14a–14f and for the flywheel with autobalance hub, respectively. The signal flow diagrams represent force and displacements which produce the first flexural mode of imbalance. It should be noted that, just as in the case of FIGS. 14a–14f, the signal flow diagrams of FIGS. 15a and 15b deal only with the final position achieved at static equilibrium in the rotating reference frame. Both diagrams show the positive feedback in the form of the lower loop including elements $1/K_e$ and $X_{CMF}$, with the centrifugal force causing additional imbalance due to shaft flexure. The transfer function relating $F_c$ to $X_{CMD}$ in the flow graph of FIG. 15a for the prior-art flywheel arrangement is given by $$\frac{F_C}{X_{CMD}} = \frac{K\omega^2}{\omega_N^2 - \omega^2} \qquad (1)$$

where:
$F_c$ is the centrifugal force;
K is the shaft stiffness; and
$\omega_N = \sqrt{(K/M)}$, or the square root of the ratio of shaft stiffness K divided by flywheel mass M. When the frequency equals the critical speed of the first flexural mode, the transfer function of equation (1) has a value of infinity.

Similarly, the transfer function of the flow graph of FIG. 15b, including the controller according to the invention, is given by $$\frac{F_C}{X_{CMD}} = \frac{M\omega^2}{1 + \omega^2 \left( \frac{M_b \, \text{GAIN}}{K_{COL}} - \frac{M}{K_e} \right)} \qquad (2)$$

where:
$M_b$ is the balance mass;
$K_e$ equals $K (K_{COL})/(K+K_{COL})$;
$K_{COL}$ is the hub collar stiffness, based upon the assumption that the maximum mass-displacement product for the balance masses is sufficient to compensate for the mass-displacement product of the initial imbalance of the flywheel (in other words, $X_{CMD}$ multiplied by the mass of the flywheel). The centrifugal force $F_c$ is the input signal to the controller of FIG. 15b. As described above, the auto-balance mass shift produces an offset of the CM of the balance masses. The value of mass of the entire balance mass system (the sum of all of the individual balance masses added together) is designated $M_b$ in the signal flow diagram of FIG. 15b. This mass offset is in that direction which opposes the CM offset of the flywheel, and this is the reason for the −1 multiplier in the control loop including elements $1/K_{COL}$, GAIN, and $M_b \omega^2$. The offset of the CM of the balance masses produces a balancing force $F_b$ which reduces the net centrifugal force. The auto-balance portion of the signal flow graph of FIG. 15b is a negative feedback loop. Just as in the case of the flow chart of FIG. 15a of the basic flywheel arrangement, the signal flow diagram deals only with the final position achieved at static equilibrium in the rotating reference frame, but does not deal with the dynamics of bellows inflation and shifting of the rods in reaching this position of static equilibrium. The gain of the auto-balance controller, indicated in the signal flow diagram of FIG. 15b as GAIN, is the transfer function relating the deformation of the flexible hub collar to the final offset of the CM of the system of balance masses. The stiffness of the flexible hub collar is indicated as $K_{COL}$ in the figure. The stiffness in the positive feedback loop is shown as $K_e$ instead of K, because the hub places an additional component, namely the flexible collar, in the load path between the flywheel and the shaft. The effective stiffness $K_e$ is the equivalent of the shaft stiffness in mechanical series with the collar stiffness. As described above, the deformation of the hub collar alters the discharge gaps for the system of bellows, with some bellows becoming more inflated and others becoming less inflated. This inequality of bellows inflation pushes the balance masses circumferentially around the raceway in the direction which reduces the imbalance of the overall rotating system. A comparison of equations (1) and (2) shows that the auto-balance controller results in a modification of the transfer function. This is an important capability which cannot be achieved with manual balancing.

The GAIN term in FIG. 15b is proportional to the air supply pressure generated by the turbine. This pressure is proportional to the square of the rotation frequency ω. Therefore, it is convenient to view the overall GAIN term as $$\text{GAIN} = \omega^2 \, G_{MECH} \qquad (3)$$

where $G_{MECH}$ is simply a number which describes certain characteristics of the system under the assumption of linear operation. For example, the graph of FIG. 6a relating bellows air pressure to discharge gap dimension or the graph of FIG. 13b relating bellows air pressure to the effective diameter of the bellows inlet port are treated as straight lines within the normal operating range of the system. The $G_{MECH}$ term includes all of the aspects of the GAIN term which are not dependent on angular velocity, such as the number of bellows units, the diameter and length of the tubing, etc. It also includes such factors as the surface area of contact between the bellows and the rods, the stiffness of the bellows, the radii of the turbine compartment and of the inner race, etc. If a pneumatic amplifier is included in the circuit, the GAIN term is proportional to the $4^{th}$ power of ω, and equations (3), (4), and (5) don't apply.

If $G_{MECH}$ is larger than a critical value called "$G_{CRIT}$"

$$G_{CRIT} = \left(\frac{M}{K_e}\right)^2 \frac{K_{COL}}{4M_B} \qquad (4)$$

the first flexural mode of imbalance is totally eliminated (i.e. there is no frequency at which the shaft becomes unstable in this mode). For values of $G_{MECH}$ less than $G_{CRIT}$, the first flexural mode occurs at two distinct frequencies, $\omega_{N1}$ and $\omega_{N2}$. The formulae for calculating $\omega_{N1}$ and $\omega_{N2}$ are $\omega_{N1} = \sqrt{D_1}$ and $\omega_{N2} = \sqrt{D_2}$, where $$D_1 = \frac{-C_2 - (C_2^2 - 4C_1)^{1/2}}{2C_1} \qquad (5)$$

$$D_2 = \frac{-C_2 + (C_2^2 - 4C_1)^{1/2}}{2C_1}$$

$$C_1 = \frac{M_b \, G_{MECH}}{K_{COL}}$$

$$C_2 = -\frac{M}{K_e}$$

Figure 16:
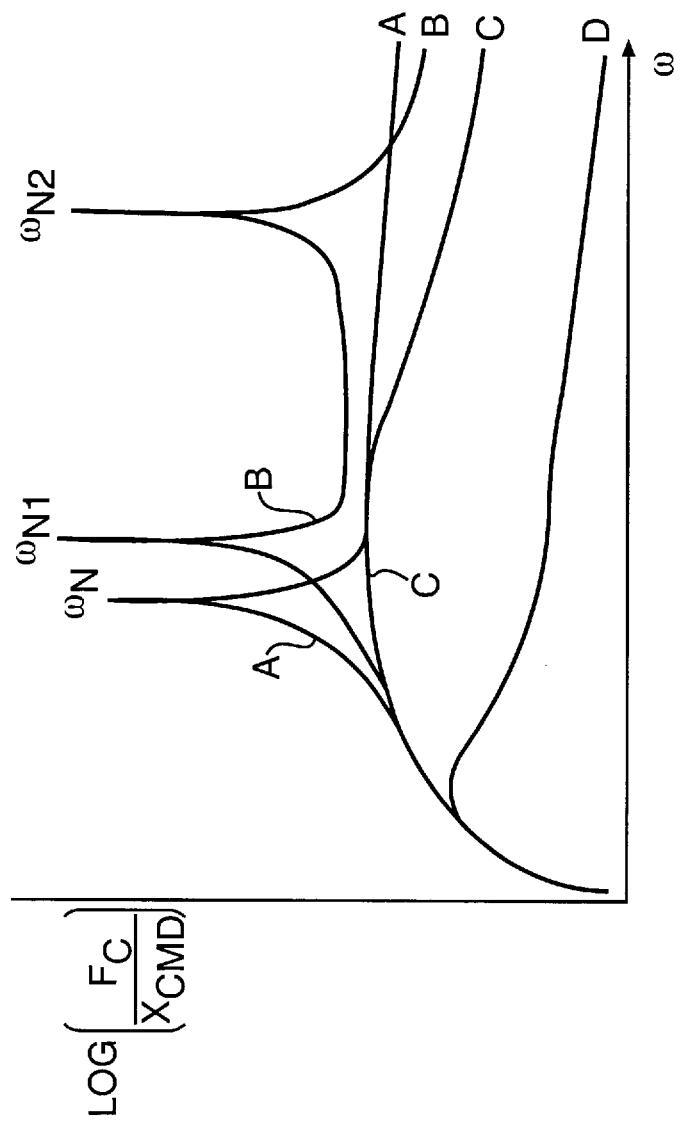
FIG. 16 plots control bandwidth under different operating conditions.

The graphs of FIG. 16 show the frequency response or transfer function of the logarithm of the magnitude of the force $F_c$ divided by $X_{CMD}$, for the autobalance hub which does not use pneumatic amplifiers, for four different values of the ratio of $G_{MECH}$ to $G_{CRIT}$. In FIG. 16, plot A represents the bandwidth for a value of $G_{MECH}/G_{CRIT}$ of 0, plot B represents the bandwidth for $G_{MECH}/G_{CRIT}$ of 0.5, and plots C and D are for values of 2 and 100, respectively. Graph A thus represents the situation when $G_{MECH}$ (and therefore, GAIN) is zero, which means that the balance masses do not shift in response to an imbalance. The condition represented by plot A of FIG. 16, then, is the same as for the basic flywheel system, except that the collar stiffness and the mass of the hub affects the critical frequency. Graph A, therefore, has a single critical frequency labeled as $\omega_N$. Graph B of FIG. 16 shows the bandwidth when the $G_{MECH}/G_{CRIT}$ ratio is 0.5. The two critical frequencies are shown as $\omega_{N1}$ and $\omega_{N2}$. These two critical frequencies will always be higher than the single critical frequency $\omega_N$ which applies when $G_{MECH}$ is zero. Graph C of FIG. 16 shows the situation when the $G_{MECH}/G_{CRIT}$ ratio is 2, indicating that no critical frequency exists for the first flexural mode. Graph D shows the situation when the $G_{MECH}/G_{CRIT}$ ratio is 100. Theoretically, the $G_{MECH}$ value can be increased to the point where the $F_c$ versus $X_{CMD}$ transfer function is essentially zero. In actual practice, however, second-order effects will set an upper limit on the maximum value of $G_{MECH}$.

In the development and discussion of the signal flow diagrams and equations of FIGS. 14a–14f, 15a and 15b, and 16, the shaft was assumed to be supported at both ends. If the shaft is supported only at the motor, in a cantilevered arrangement, with the other end free, the critical frequency for the first flexural mode of vibration is much lower.

In considering the dynamic response of the controller system in reaching the condition of static equilibrium within the rotating reference frame, the flexible bellows and balance masses can be considered to be a second-order system. The resistance to air flow caused by the various inlet and exit ports causes the system to be highly overdamped. This overdamping means that, to a good approximation, the dynamic response of a system according to the invention is essentially that of a first order system. In response to an imbalance, the control system converges essentially exponentially to the condition of static equilibrium in the rotating system. The time constant of this convergence is much longer than the period of rotation of the hub at operational speed, therefore the distortion of the hub caused by gravitational effects (which are misinterpreted by the control system to be a net centrifugal force due to imbalance) occurs at a frequency much higher than the response bandwidth of the control system. Therefore, the control system does not respond to the effect of gravity, and the effect of gravity on the controller is negligible.

Figure 17B:
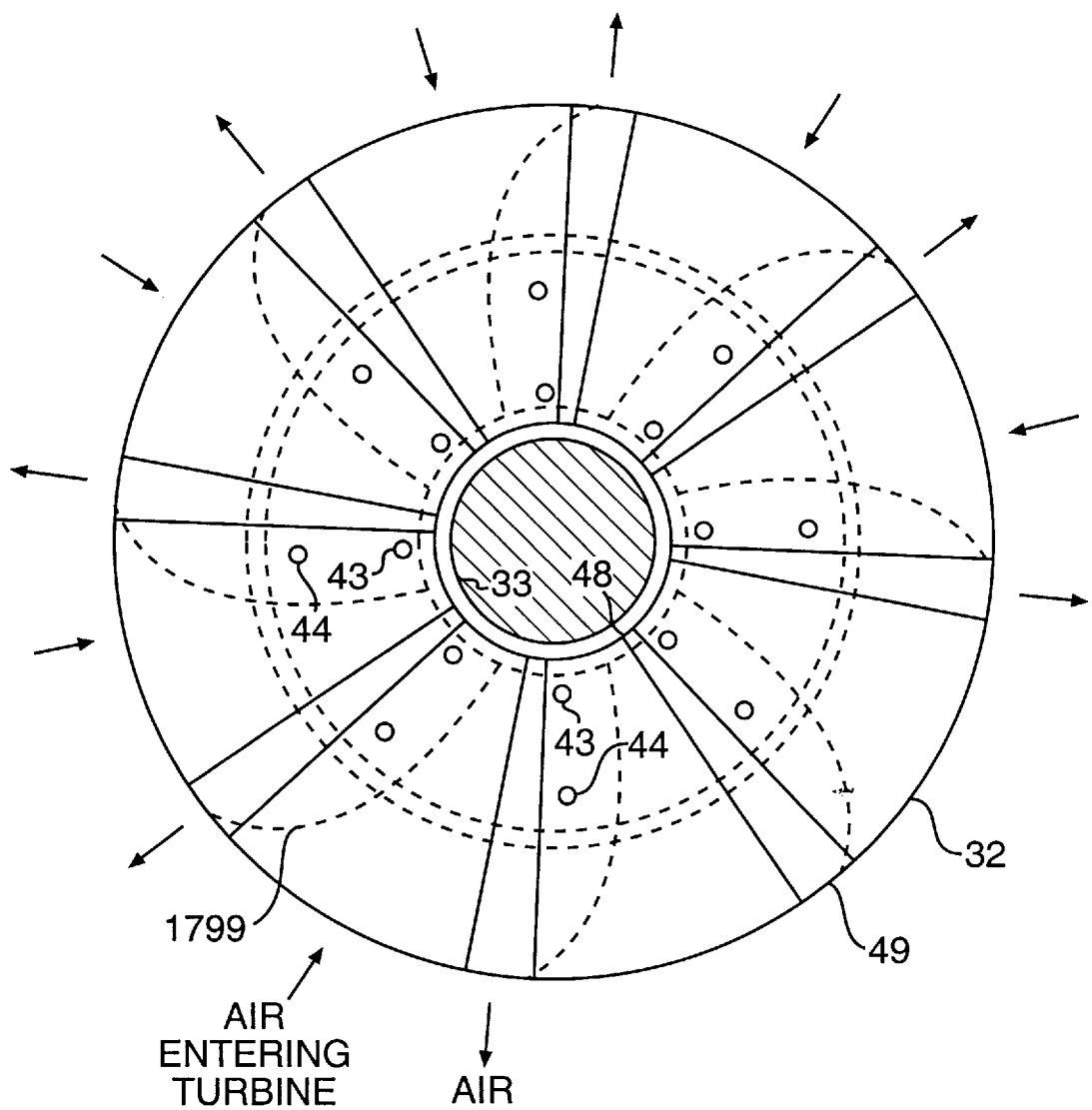
Figure 18:
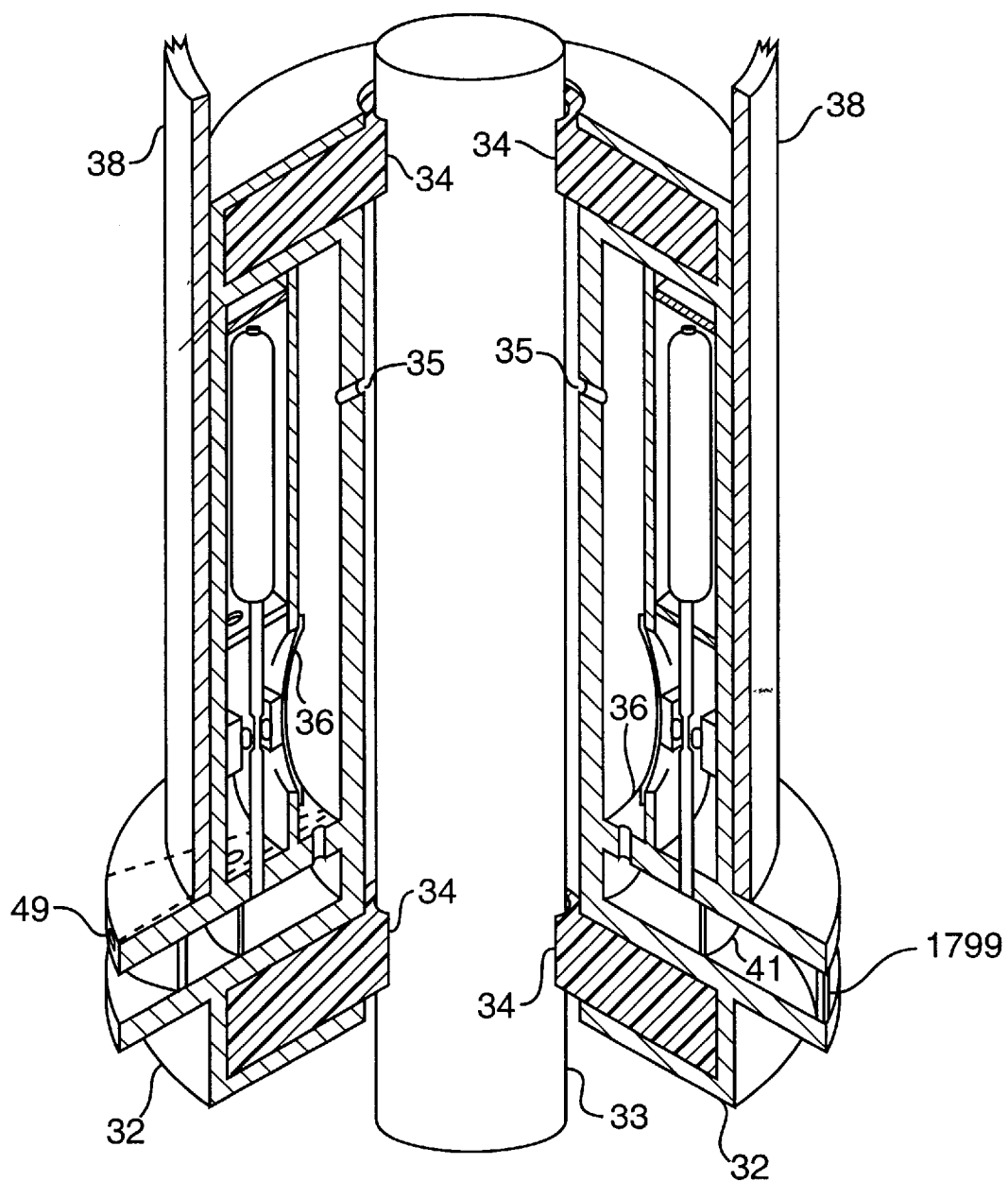
Figure 19:
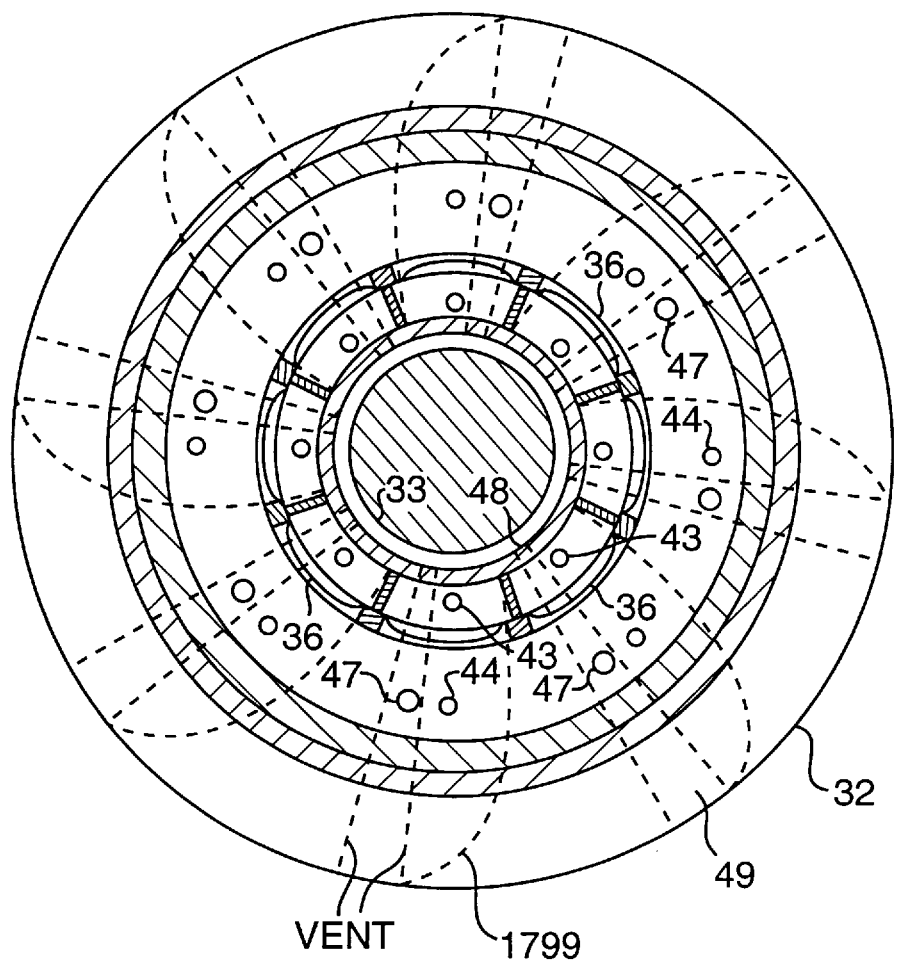
Figure 20:
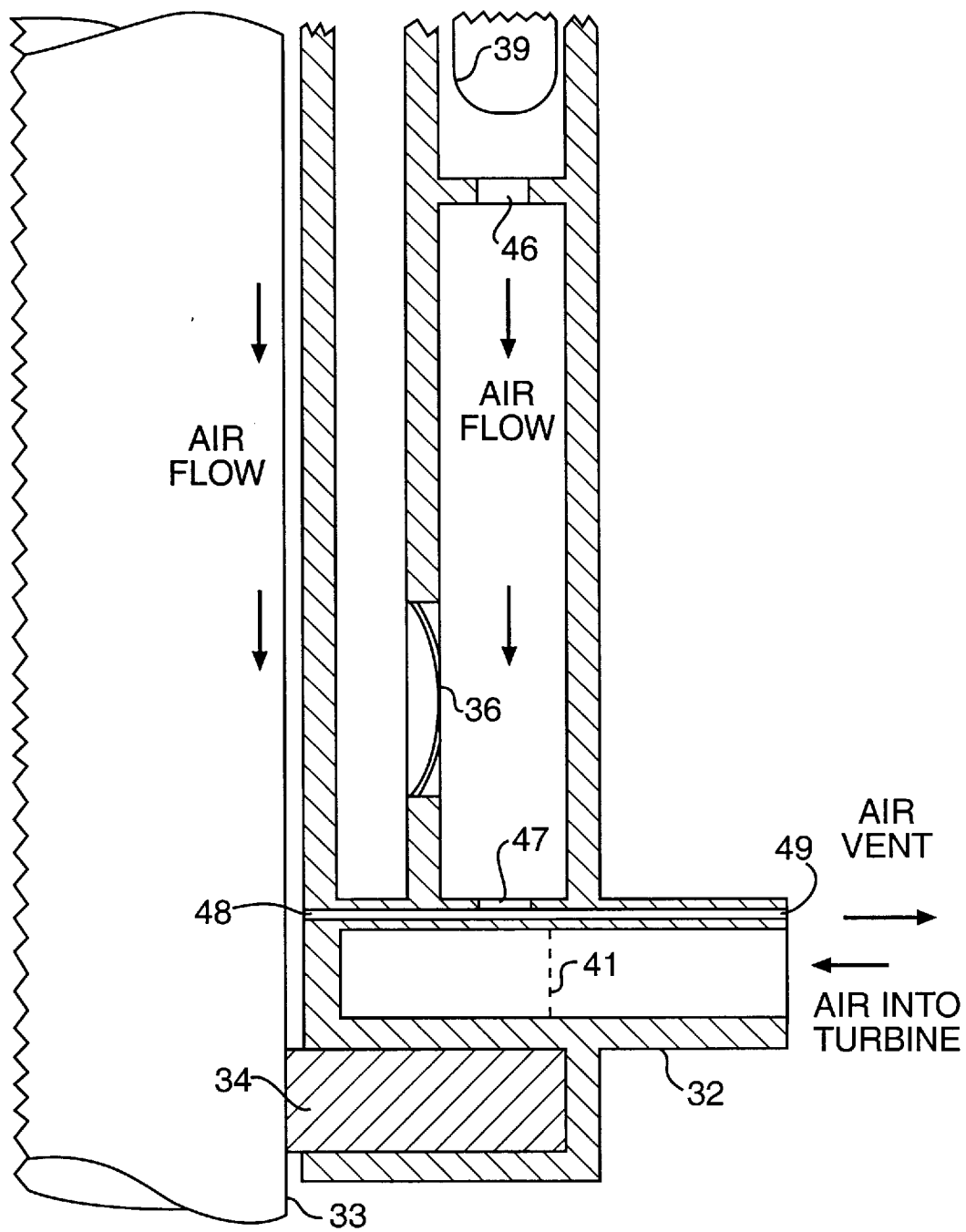
Figure 21:
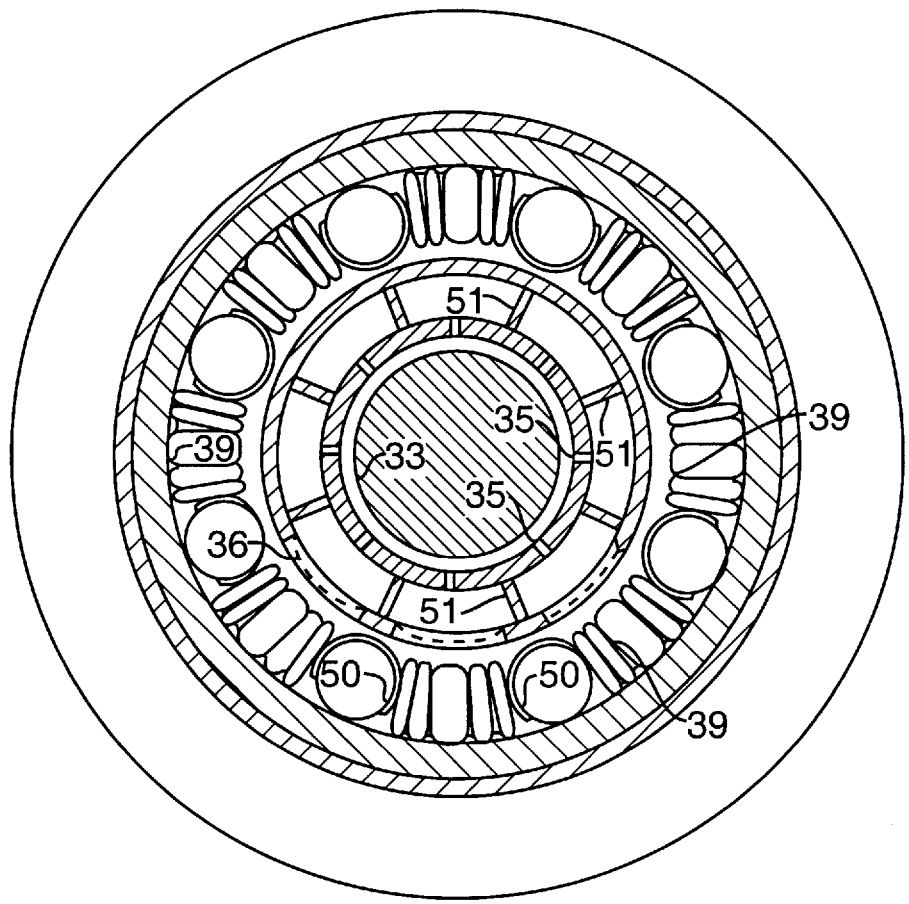

TWO DIFFERENT SPECIFIC DESIGN EXAMPLES:

FIGS. 17a, 17b, 18, 19, 20, and 21 together illustrate a first embodiment of the invention. The reference numerals are common among FIGS. 17a, 17b, 18, 19, 20, and 21. The first embodiment uses a pneumatic amplifier as described in conjunction with FIG. 12B. FIG. 17a is a section view through the longitudinal centerline of the hub. FIG. 17b is a detailed view of the turbine at section line 17b–17b of FIG. 17a, and FIGS. 19 and 21 are views of the structure of FIG. 17a at section lines 19—19 and 21—21, respectively. FIG. 18 is an isometric view of the arrangement of FIG. 17a, and FIG. 20 is a detail of FIG. 17a illustrating the airflow. In FIGS. 17a, 17b, 18, 19, 20, and 21, flexible collars 34 are used to mount the hub 32 to the central shaft 33. The main body of the hub 32 is interposed between the central rotor shaft 33 and a rotor tube 38. Rotor tube 38 is therefore driven by central rotor shaft 33, and provides a cylindrical surface upon which a flywheel or other rotated object (such as a yarn bobbin) may be mounted. Note that the arrangement of FIGS. 17a, 17b, 18, 19, 20, and 21 does not include two nested shells as shown in conjunction with FIGS. 3A–3E and 5a–5c. The inner annular chamber 1710 formed by the space between central shaft 33 and the inner wall of hub body 32 is the receiving chamber for air leaving the discharge ports 35. This receiving annular chamber 1710 is vented to the outside by eight separate vents, one of which is designated as 48 in FIG. 17b. The air flowing through vent 48 reaches the outside by way of a vent 49. The flattened, pie shaped vent chamber which connects vents 48 and 49 is thin, but wide enough to present a low resistance pathway for air flow from the inside of the unit to the outside. Discharge port 35 is the outlet for air in the amplification chamber 1712. Flexible diaphragm 36 applies force to the air constriction mechanism 37, which is simply a means of applying the force to a small segment of the bellows inlet tube, which comprises an inlet port 42. The air pressure of bellows 39 is controlled generally as described in conjunction with FIG.

12B. As the air pressure in the amplification chamber 1710 increases, the constriction mechanism 37 pushes against the tube at point 42 with more force, thereby reducing the effective diameter of the bellows inlet port. Bellows 39 is vented to the outer annular chamber 1714 by bellows vent 45. The air leaving vent 45 passes through vents 46 and 47, reaches the pie shaped vent chamber, and flows from vent 49. The bellows system of the arrangement of FIGS. 17a, 17b, 18, 19, 20, and 21 has eight individual bellows units. The bellows are shown only schematically in FIGS. 17a, 18, 20, and 21. Although not shown, the bellows unit is guided by roller wheels on guide brackets having stroke limiting slots, as described in conjunction with FIG. 9. Eight balance masses 50 are situated between the eight bellows units, as illustrated in FIG. 21. These balance masses are rollers (solid rods) housed in roller shells as illustrated in FIG. 9. The turbine compartment 40 contains a turbine, better illustrated in FIG. 17b. Each turbine segment (region between any two adjacent blades, illustrated by curved dash lines 1799) of FIG. 17b is associated with two separate air supply tubes 43 and 44, rather than the single air supply tube described in conjunction with FIG. 10. Air supply tube 43 supplies air pressure to the amplification chamber, while air supply tube 44 supplies the bellows. The turbine has a replaceable air filter illustrated in FIG. 17a by a dash line 41. In FIG. 21, the hatching is partially removed to illustrate diaphragm 36, and the elements designated as 51 are part of the hub body 32, which form the side walls of eight individual pneumatic amplification chambers.

The auto-balance shift for the hub arrangement of FIGS. 17a, 17b, 18, 19, 20, and 21 is described as follows: When the discharge gap for port 35 is reduced, the air pressure in the amplification chamber increases, which causes the flexible diaphragm to push with more force on the constriction mechanism, whereby the effective diameter of the bellows inlet port is reduced. This, in turn, reduces the amount of inflation of the specific bellows unit which is associated with that discharge port. The circumferential pattern of inflation of the overall system of bellows in response to a centrifugal force applied to the hub is the same as that shown in FIG. 5a, although the hub shown in FIG. 5a is of a different design. The action can be recognized, therefore, to be consistent with the above discussion of the basic auto-balance response, with particular reference to FIGS. 1A, 1D, 1B, 1C, 2a, 2b, 5a, 5b, 5c, and 12b.

Figure 22:
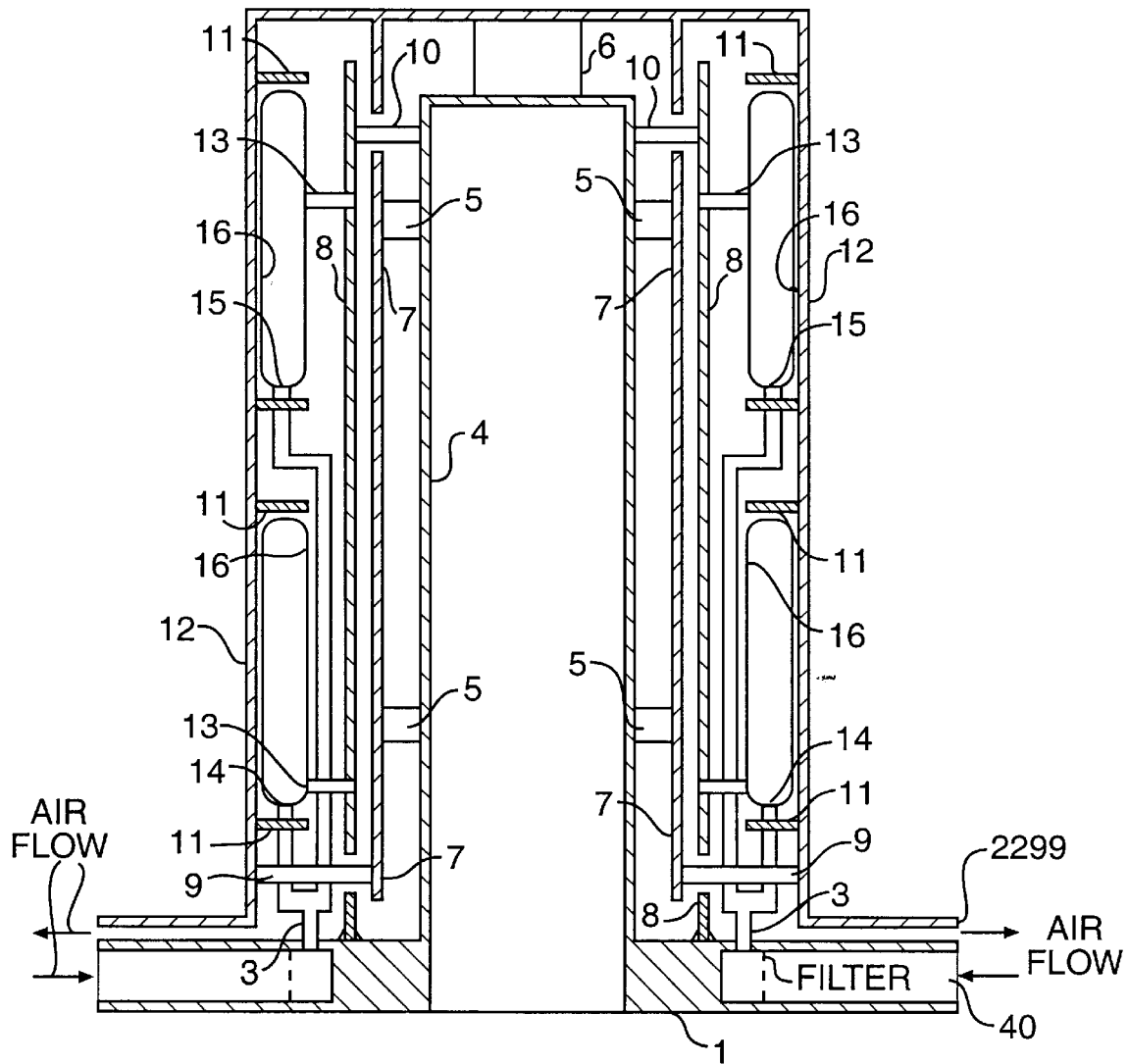
Figure 23:
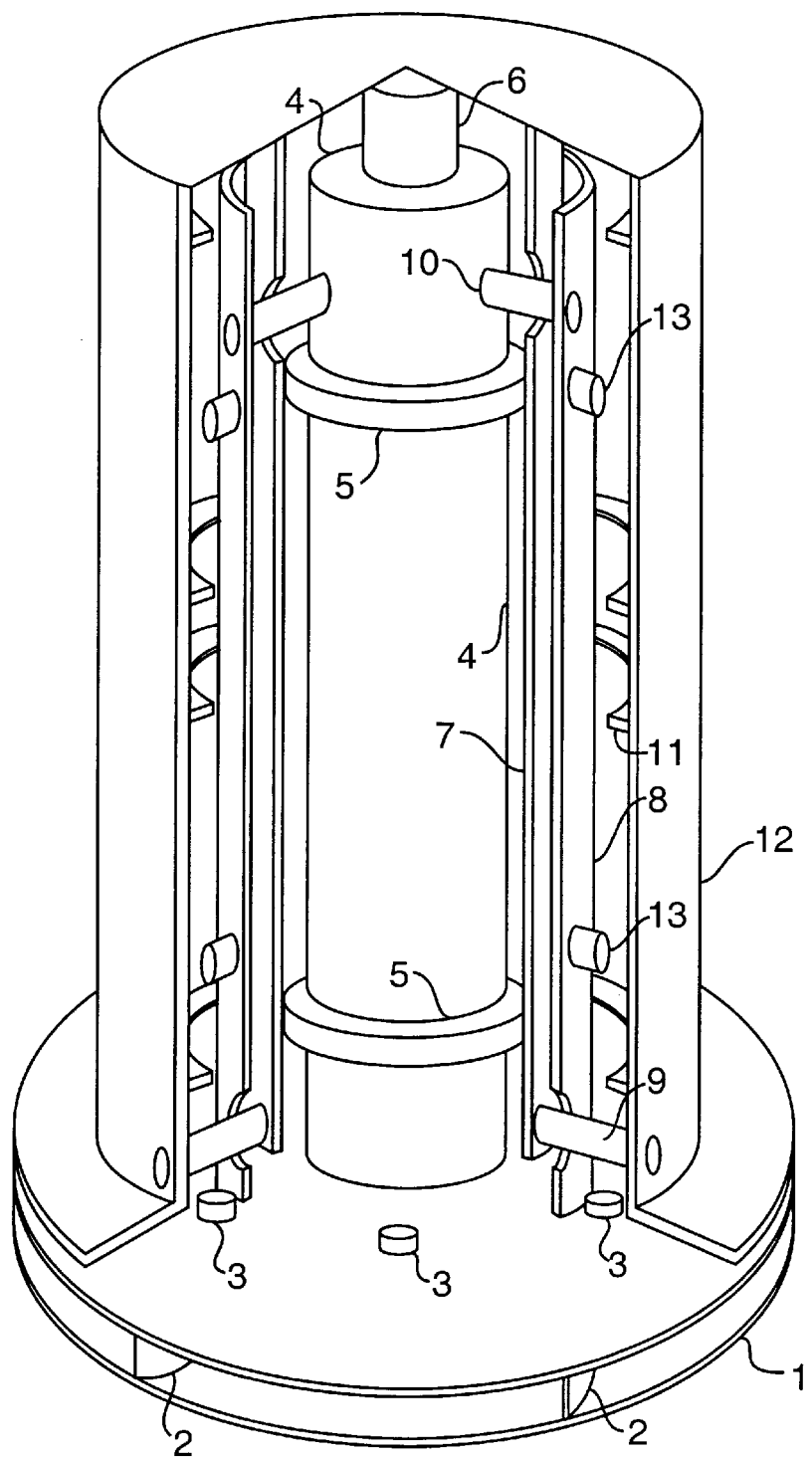
FIG. 23 is an isometric view thereof.
Figure 24:
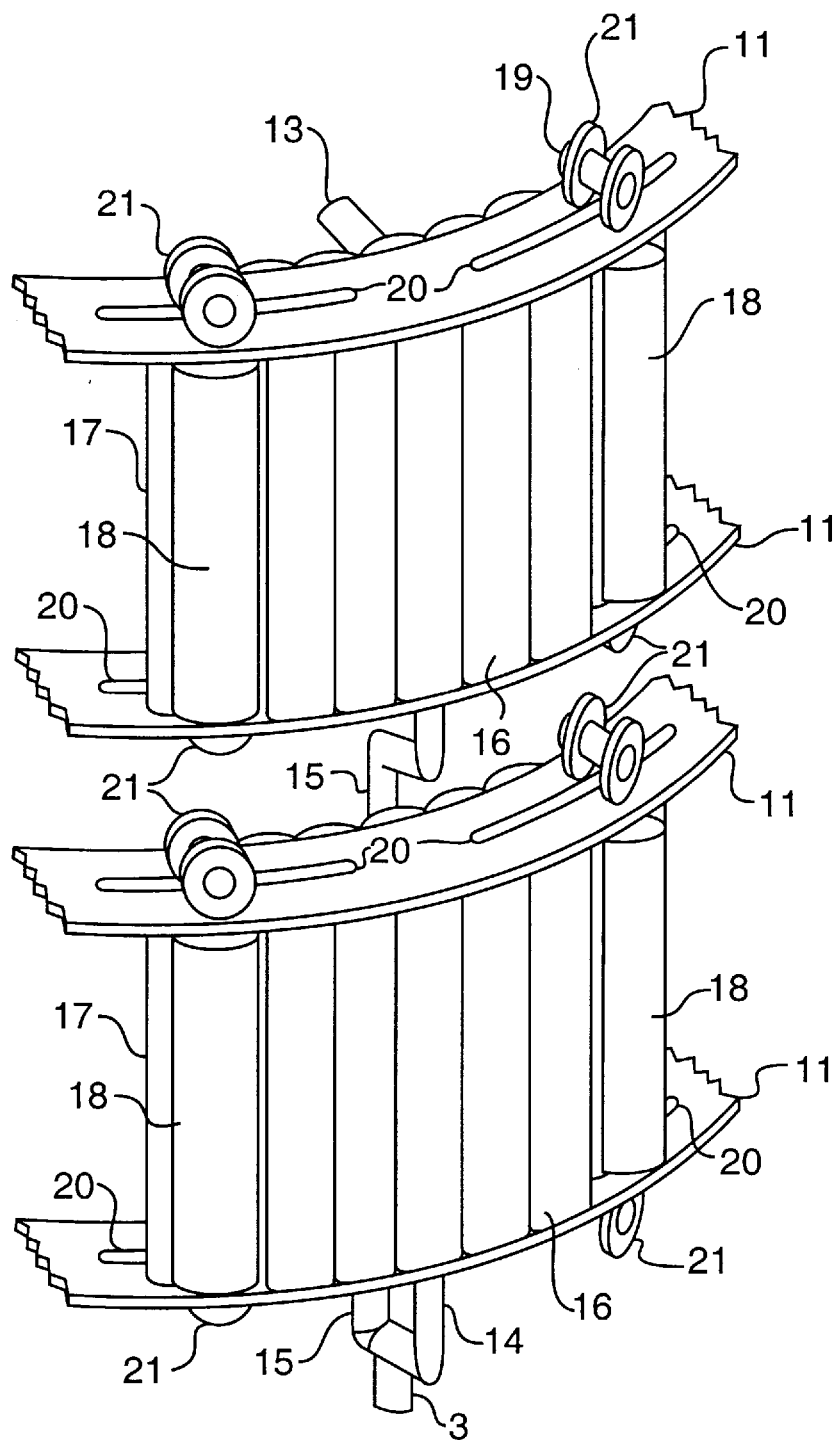
FIG. 24 shows a dual autobalance assembly thereon.

Another embodiment of the invention is illustrated in FIGS. 22, 23, 24, 25A and 25B, which does not use an amplification chamber. FIG. 22 is a cross-section taken through the longitudinal centerline of the hub, FIG. 23 is an isometric view (without bellows or rollers, which are illustrated in FIG. 24 shows a dual autobalance assembly, and FIGS. 25A and 25B show the hub arrangement exploded and assembled, respectively, as a part of a concentrically stacked assembly used for balancing a yarn bobbin. This arrangement is based on the nested two shell arrangement described in conjunction with FIGS. 3a–3e and 5a–5c. In FIGS. 22, 23, 24, 25A and 25B, hub 1 has an inner shell made up of tubes 4 and 8, and an outer shell comprised of tubes 7 and 12. The turbine compartment 40 houses eight turbine blades 2. The hub is designed to fit over the central rotor shaft 2170, which is driven by a motor 2512 as indicated in FIG. 25. The arrangement of FIGS. 22, 23, 24, 25A and 25B uses two separate auto-balance assemblies spaced along the shaft, so that it is capable of performing "two-plane" or dynamic balancing. Each of the separate auto-balance assemblies is composed of eight bellows units and eight balance masses (rollers). The bellows are indicated only schematically in FIG. 22, and are not shown in FIG. 23. The rollers are not shown in either FIGS. 22 or 23. FIG. 24 shows one bellows unit and associated rollers for each level of the dual arrangement. Structural support rods 9 provide strength to the outer shell piece. Structural support rods 10 provide strength to the inner shell piece. The two shell pieces are connected by flexible collars 5 and flexible column 6. These flexible components allow the outer shell piece to shift slightly in response to a net centrifugal force. Eight air supply tubes 3 supply air from the turbine compartment 40 to the bellows. Each turbine segment (the space between two adjacent blades) has a replaceable air filter as indicated in FIG. 22. Each of the eight supply tubes 3 is connected to a separate turbine segment. Each tube 3 splits into separate individual supply tubes 14 and 15. Supply tubes 14 provide air flow to the bellows units of the lower auto-balance assembly (the assembly closest to the turbine), and each bellows unit of the lower auto-balance assembly is supplied by a separate supply tube 14. Supply tubes 15 provide air flow to the bellows units of the upper auto-balance assembly, and each bellows unit of the upper auto-balance assembly is supplied by a separate supply tube 15. Each bellows unit is vented to the annular receiving chamber (between tubes 7 and 8) by discharge ports 13. Air is vented from the hub by passing through the vent chamber 2299 which occupies the space between the turbine compartment and the outer shell 12, as illustrated in FIG. 22. Two bellows units 16 and associated rollers 18 are shown in FIG. 24. Two pairs of roller guide brackets 11 having stroke limiting slots 20 are used to guide the rollers 18 which are housed in roller shells 17. Roller wheels 21 allow the roller shells to travel circumferentially within the allowed stroke. It will be recognized that the arrangement of FIG. 24 is a dual version of the arrangement shown in FIG. 9.

The present invention provides a simple and cost effective approach to automatic rotor balancing. The invention may be retrofitted to existing equipment, and can be designed into new machinery.

Thus, an automatic balance arrangement according to one aspect of the invention includes a rotor or shaft (24, 28) which rotates about an axis of rotation (8). A rotated mass (23, 27, 31), which may be a flywheel or bobbin is flexibly affixed to the rotor (24, 28), and defines a center of mass which may not lie on the axis of rotation (8) of the rotor (24, 28). The rotated mass (23, 27, 31) may sometimes be off-balance, so that it defines a light side and a heavy side. When rotatably driven by the rotor (24, 28), such an unbalanced rotated mass has a tendency to rotate about an axis of rotation which does not coincide with the axis of rotation (8) of the rotor (24, 28). This may result in vibration. A plurality of fluid apertures (30p) are mounted on either the rotor (24, 28) or the rotated mass (23, 27, 31), or in other words are mounted on one of the rotor and the rotated mass. The fluid apertures circumferentially spaced about the one of the rotor and the rotated mass, with each of the fluid apertures (30p) spaced from a portion (27; 24) of the rotated mass (23, 27, 31) or the rotor (24, 28), respectively, by an associated fluid discharge gap γ. The dimension of gap γ is nominally equal to that of the other fluid discharge gaps γ, but the dimensions of the associated fluid discharge gaps γ varies circumferentially when the axis of rotation of the rotated mass (23, 27, 31) does not coincide with the axis of rotation (8) of the rotor (24, 28). A plurality of weights (25) are circumferentially spaced about and mounted on the rotated mass (23, 27, 31). The weights (25) are arranged for circumferential motion relative to the rotated mass (23, 27, 31). The nominal mounting locations of the weights (25) about the rotated mass (23, 27, 31) is selected so that the center of mass of the weights (25) in conjunction with the rotated mass (23, 27, 31) is nominally at the center of rotation of the rotated mass (23, 27, 31). Each of a plurality of weight position controllers (26) is coupled to one of the weights (25), and is arranged for circumferential motion in a first direction in response to a contraction in the dimension of the associated one of the fluid gaps, and for circumferential motion in a second direction in response to expansion of the dimension of the associated one of the fluid gaps. The first and second directions are selected to move the associated one of the weights circumferentially away from the heavy side of the rotated mass and toward the light side of the rotated mass, whereby the rotated mass tends to be balanced and the vibration reduced.

In a particular embodiment (FIGS. 5a, 5b, 5c) of the invention, the plurality of fluid apertures (30p) are mounted on the rotor (24, 28), with each of the fluid apertures (30p) spaced from the portion (27) of the rotated mass (23, 27, 31) by an associated fluid discharge gap ($\gamma$). The dimensions of the fluid discharge gaps are nominally equal to those of the other fluid discharge gaps, but vary circumferentially when the axis of rotation of the rotated mass (23, 27, 31) does not coincide with the axis of rotation (8) of the rotor (24, 27). The variation in dimension is such that those of the fluid apertures which are adjacent the heavy side of the rotated mass (23, 27, 31) are associated with relatively smaller ones of the fluid discharge gaps, and those of the fluid apertures which are adjacent the light side of the rotated mass are associated with relatively larger ones of the fluid discharge gaps. In this particular embodiment of the invention, the weight position controllers (26) are arranged for expansion in response to a contraction in the dimension of the associated one of the fluid gaps, and for contraction in response to expansion of the dimension of the associated one of the fluid gaps. Each of the weight position controllers (26) is located on the same side of the rotated mass (23, 27, 31) as its associated fluid gap, relative to the axis of rotation (8) of the rotor (24, 27). This results in the effect that those weight position controllers (26) on that side of the rotated mass (23, 27, 31) which, during rotation, have the smaller or smallest fluid discharge gaps, tend to move their associated weights (25) circumferentially away from the side of the rotated mass having the smaller fluid discharge gaps, which is the heavy side of the rotated mass, toward the light side of the rotated mass, and those weight position controllers on that side of the rotated mass which, during rotation, have the larger or largest fluid discharge gap, tend to move their associated weights circumferentially toward the side of the rotated mass having the larger fluid discharge gap, which is the light side of the rotor. The weight position controllers may be located between mutually adjacent weights. The weight position controllers may include bellows.

In another embodiment (FIG. 11) of the automatic balance arrangement, the fluid apertures (30p) are mounted on the rotated mass (23, 27, 31), with each of the fluid apertures (30p) spaced from a particular longitudinal portion of the rotor (24, 27) by an associated fluid discharge gap ($\gamma$), the dimension of which is nominally equal to that of the other fluid discharge gaps. The dimensions of the associated fluid discharge gaps varies circumferentially when the axis of rotation of the rotated mass does not coincide with the axis of rotation of the rotor (24, 27), with the variation in dimension being such that those of the fluid apertures which are adjacent the heavy side of the rotated mass are associated with relatively larger ones of the fluid discharge gaps, and those of the fluid apertures which are adjacent the light side of the rotated mass are associated with relatively smaller ones of the fluid discharge gaps. The weight position controllers (26) are arranged for expansion in response to an contraction in the dimension of the associated one of the fluid gaps, and for contraction in response to an expansion of the dimension of the associated one of the fluid gaps. These weight position controllers are located diametrically opposed, relative to the axis of rotation (8) of the rotor, to their associated fluid gaps , with the effect that those weight position controllers (26) on that side of the rotated mass which, during rotation, has the smallest fluid discharge gap, tend to move their associated weights circumferentially away from the side of the rotated mass having the largest fluid discharge gap, which is the heavy side of the rotated mass, toward the light side of the rotated mass, and those weight position controllers on that side of the rotated mass which, during rotation, has the largest fluid discharge gap, which is the heavy side of the rotated mass, tend to move their associated weights circumferentially toward the side of the rotated mass having the smallest fluid discharge gap, which is the light side of the rotated mass. In a preferred embodiment of the invention, the fluid is air, the actuators are bellows, and the change in dimension of the actuators is occasioned by relative inflation or deflation.

Other embodiments of the invention will be apparent to those skilled in the art. For example, while a pneumatic system has been described, it may instead be hydraulic, or operated by any other fluid, either liquid or gas, as desired. While cylindrical weights or masses 25 have been illustrated, balls and other shapes (ellipsoids, cones, etc.) can be used instead of cylinders. While the pneumatic amplifier has been illustrated as using a diaphragm, a piston/cylinder arrangement is equivalent, and can also be used.

What is claimed is:

1. An automatic balance arrangement, comprising:

a rotor which rotates about an axis of rotation;

a rotated mass flexibly affixed to said rotor, said rotated mass defining a center of mass which may not lie on said axis of rotation of said rotor, whereby said rotated mass defines a light side and a heavy side, and, when rotatably driven by said rotor, has a tendency to vibrate;

a plurality of fluid apertures mounted on one of said rotor and said rotated mass, and circumferentially spaced thereabout, with each of said fluid apertures spaced from a portion of the other one of said rotor and said rotated mass by an associated fluid discharge gap, the dimension of which fluid discharge gap is nominally equal to that of the other fluid discharge gaps, but which dimension of said associated fluid discharge gap varies circumferentially when said center of mass of said rotated mass does not coincide with said axis of rotation of said rotor;

a plurality of weights circumferentially spaced about and mounted on said rotated mass, said weights being arranged for circumferential motion relative to said rotated mass, the nominal mounting location of said weights about said rotated mass being selected so that the center of mass of said weights in conjunction with said rotated mass is nominally at said center of rotation of said rotated mass;

a plurality of weight position controllers, each of said weight position controllers being coupled to one of said weights, and being arranged for circumferential motion in a first direction in response to a contraction in the dimension of the associated one of said fluid discharge gaps, and for circumferential motion in a second direction in response to expansion of the dimension of said associated one of said fluid discharge gaps, said first and second directions being selected so that motion of said associated one of said weights is circumferentially away from said heavy side of said rotated mass and toward said light side of said rotated mass, whereby said rotated mass tends to be balanced and said vibration reduced.

2. An automatic balance arrangement according to claim 1, wherein said plurality of fluid apertures are mounted on said rotor, the variation in dimension of said fluid discharge gaps being in such a manner that those of said fluid apertures which are adjacent said heavy side of said rotated mass are associated with relatively smaller ones of said fluid discharge gaps, and those of said fluid apertures which are adjacent said light side of said rotated mass are associated with relatively larger ones of said fluid discharge gaps; and said weight position controllers being arranged for expansion in response to a contraction in the dimension of the associated one of said fluid discharge gaps, and for contraction in response to expansion of said dimension of said associated one of said fluid discharge gaps, each of said weight position controllers being located on the same side of said rotated mass as that one of said fluid discharge gaps with which said weight position controllers is associated, relative to said axis of rotation of said rotor, with the effect that those weight position controllers on that side of said rotated mass which, during rotation, has the smallest fluid discharge gap, tend to move their associated weights circumferentially away from said side of said rotated mass having said smallest fluid discharge gap, which is said heavy side of said rotated mass, toward said light side of said rotated mass, and those weight position controllers on that side of said rotated mass which, during rotation, has the largest fluid discharge gap, tend to move their associated weights circumferentially toward said side of said rotated mass having said largest fluid discharge gap, which is said light side of said rotor.

3. An automatic balance arrangement according to claim 2, wherein each of said weight position controllers comprises a bellows actuator.

4. An automatic balance arrangement according to claim 3, wherein each of said bellows actuators is circumferentially located between one of said weights and another of said weights which is the next circumferentially adjacent one of said weights.

5. An automatic balance arrangement according to claim 1, wherein each of said weight position controllers is located between one of said weights and a circumferentially adjacent one of said weights, and each of said weight position controllers is arranged for circumferential expansion in response to a contraction in the dimension of the associated one of said fluid discharge gaps, and for circumferential contraction in response to expansion of said dimension of said associated one of said fluid discharge gaps, whereby those of said weight position controllers on that side of said rotated mass which, during rotation, has the smaller fluid discharge gap tend to enlarge relative to those of said weight position controllers which lie on that side of said rotated mass which has the larger fluid discharge gap, as a result of which those of said weight position controllers which tend to enlarge more tend to push their adjacent weights circumferentially from said heavy side of said rotated mass toward said light side of said rotated mass in a manner which tends to move said axis of rotation of said rotated mass toward said axis of rotation of said rotor, and thereby reduce vibration.

6. An automatic balance arrangement according to claim 1, wherein said plurality of fluid apertures are mounted on said rotated mass, with each of said fluid apertures spaced from said portion of said rotor by an associated fluid discharge gap, the dimension of which is nominally equal to that of the other fluid discharge gaps, but which dimension of said associated fluid discharge gap varies circumferentially when said axis of rotation of said rotated mass does not coincide with said axis of rotation of said rotor, said variation in dimension being in such a manner that those of said fluid apertures which are adjacent said heavy side of said rotated mass are associated with relatively larger ones of said fluid discharge gaps, and those of said fluid apertures which are adjacent said light side of said rotated mass are associated with relatively smaller ones of said fluid discharge gaps; and said weight position controllers being arranged for expansion in response to an contraction in the dimension of the associated one of said fluid discharge gaps, and for contraction in response to an expansion of said dimension of said associated one of said fluid discharge gaps, said weight position controllers being located diametrically opposed to their associated fluid discharge gaps relative to said axis of rotation of said rotor, with the effect that those weight position controllers on that side of said rotated mass which, during rotation, has the smallest fluid discharge gap, tend to move their associated weights circumferentially away from said side of said rotated mass having said largest fluid discharge gap, which is said heavy side of said rotated mass, toward said light side of said rotated mass, and those weight position controllers on that side of said rotated mass which, during rotation, has the largest fluid discharge gap, which is said heavy side of said rotated mass, tend to move their associated weights circumferentially toward said side of said rotated mass having said smallest fluid discharge gap, which is said light side of said rotated mass.

7. An automatic balance arrangement, comprising:

a rotor which rotates about an axis of rotation;

a rotated mass flexibly affixed to said rotor, said rotated mass defining a center of mass which may not lie on said axis of rotation of said rotor, whereby said rotated mass defines a light side and a heavy side, and, when rotatably driven by said rotor, having a tendency to rotate about an axis of rotation which does not coincide with said axis of rotation of said rotor, as a result of which said rotated mass may vibrate;

a plurality of fluid apertures mounted on said rotor and circumferentially spaced thereabout, with each of said fluid apertures spaced from said rotated mass by an associated fluid discharge gap, the dimension of which is nominally equal to that of the other fluid discharge gaps, but which dimension of said associated fluid discharge gap varies circumferentially when said axis of rotation of said rotated mass does not coincide with said axis of rotation of said rotor in such a manner that those of said fluid apertures which lie on said heavy side of said rotated mass are associated with relatively smaller ones of said fluid discharge gaps, and those of said fluid apertures which lie on said light side of said rotated mass are associated with relatively larger ones of said fluid discharge gaps;

a plurality of weights circumferentially spaced about and mounted on said rotated mass, said weights being arranged for circumferential motion relative to said rotated mass, the nominal mounting location of said weights about said rotated mass being selected so that the center of mass of said weights in conjunction with said center of mass of said rotated mass is nominally at said center of rotation of said rotated mass;

a plurality of bellows circumferentially spaced about said rotated mass each of said bellows being located between one of said weights and a circumferentially adjacent one of said weights, each of said bellows being inflated with compressed fluid from a source of compressed fluid, and exhausted through an associated one of said fluid apertures and into that one of said fluid discharge gaps which is adjacent to said associated one of said fluid apertures, said bellows being arranged for circumferential expansion/contraction, whereupon each of said bellows tends to inflate in an amount which is related to the dimension of that one of said fluid discharge gaps which is adjacent to said associated one of said fluid apertures, with the effect that those bellows on that side of said rotated mass which, during rotation, has the smaller fluid discharge gap tend to inflate more than those bellows on that side of said rotated mass which has the larger fluid discharge gap, as a result of which those of said bellows which tend to inflate more tend to push their adjacent weights circumferentially from said heavy side of said rotated mass toward said light side of said rotated mass in a manner which tends to move said axis of rotation of said rotated mass toward said axis of rotation of said rotor, and thereby reduce vibration.

8. An arrangement according to claim 7, wherein said fluid discharge gaps are circumferentially spaced at equal angular increments.

9. An arrangement according to claim 7, wherein said source of compressed fluid is air, said fluid apertures are pneumatic apertures, and said fluid discharge gaps are pneumatic gaps.

10. An arrangement according to claim 7, wherein said weights include weights in the form of right circular cylinders.

11. An arrangement according to claim 7, further comprising fluid pressure amplification means coupled to at least one of said fluid apertures and to one of said bellows, for amplifying a fluid pressure associated with said one of said fluid apertures.

12. An arrangement according to claim 11, wherein said fluid pressure amplification means comprises:

surface means having a relatively large surface area exposed to said pressure associated with said one of said fluid apertures, and for moving in response to said pressure associated with said one of said fluid apertures, whereby mechanical forces are generated by said surface means;

valve means coupled to a source of fluid pressure and to said bellows, for coupling fluid from said source of fluid pressure to said bellows in response to mechanical motion applied to said valve means; and mechanical force coupling means coupled to said surface means and to said valve means, for applying mechanical motion to said valve means in response to said mechanical forces generated by said surface means.

13. An arrangement according to claim 12, wherein said source of fluid pressure to which said valve means is coupled is the same as said source of compressed fluid.

14. A method for reducing vibration of a rotating system including a rotating mass, said method comprising the steps of:

rotatably driving a mass from a rotor by means of a flexible coupling to thereby define a rotating mass, whereby, if said rotating mass is unbalanced and therefore defines a light side and a heavy side, said rotating mass will tend to vibrate when driven by said rotor and said flexible coupling;

providing fluid flow through a plurality of fluid apertures mounted and circumferentially spaced about one of said rotating mass and said rotor, with a nominal fluid discharge gap lying between each of said fluid apertures and the adjacent one of said rotor and rotating mass, respectively, wherein each of said nominal fluid discharge gaps tends to change in dimension in dependence upon its circumferential position relative to said light and heavy sides, and wherein the fluid pressure at each said fluid discharge gap depends upon said dimension of said fluid discharge gap;

in response to said fluid pressure from each said fluid discharge gap, applying fluid pressure to a corresponding weight position actuator of a plurality of weight position actuators mounted on said rotating mass for rotation therewith, to thereby actuate each of said weight position actuators to tend to move its associated weight circumferentially in a manner which tends to move said weights from said heavy side of said rotating mass toward said light side of said rotating mass and thereby tends to reduce said vibration.

15. A method according to claim 14, wherein said step of applying fluid pressure to a corresponding weight position actuator, in response to said fluid pressure from each said fluid discharge gap, further comprises the step of amplifying said fluid pressure from each of said fluid discharge gaps for control of said fluid pressure applied to said corresponding weight position actuator.

16. A shaft adapted for rotation;

a rotational mass subject to imbalance;

flexible means coupling said shaft to said mass for rotation therewith, said imbalance causing said flexible means to rotate in an off-center manner relative to said shaft;

distributed sensing means coupled to said shaft and to said rotational mass, for generating, for plural rotational positions about said shaft, a plurality of signals representative of the distance between said shaft and said rotational mass; and weights distributed about said rotational mass, at least some of which are responsive to said signals, for tending to move parallel to said direction of rotation in a manner which tends to balance said rotational mass.

* * * * *